(12) United States Patent
Loi et al.

(10) Patent No.: US 10,250,163 B2
(45) Date of Patent: Apr. 2, 2019

(54) INVERSE ELECTROWETTING ENERGY HARVESTING AND SCAVENGING METHODS, CIRCUITS AND SYSTEMS

(71) Applicant: STMicroelectronics S.R.L., Agrate Brianza (IT)

(72) Inventors: Sara Loi, Villaputzu (IT); Alberto Pagani, Nova Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 308 days.

(21) Appl. No.: 15/143,015

(22) Filed: Apr. 29, 2016

(65) Prior Publication Data

US 2017/0317610 A1 Nov. 2, 2017

(51) Int. Cl.
*H02N 1/08* (2006.01)
(52) U.S. Cl.
CPC .................................... *H02N 1/08* (2013.01)
(58) Field of Classification Search
CPC ........................................................ H02N 1/08
USPC ........................................................ 310/300
See application file for complete search history.

(56) References Cited

U.S. PATENT DOCUMENTS

| | | | |
|---|---|---|---|
| 6,911,132 B2 | 6/2005 | Pamula et al. | |
| 7,898,096 B1 | 3/2011 | Krupenkin | |
| 9,242,851 B2 * | 1/2016 | Geisberger | ............ B81B 3/0027 |
| 2010/0225255 A1 * | 9/2010 | Franke | .................. B81B 3/0021 |
| | | | 318/116 |
| 2010/0295415 A1 * | 11/2010 | Despesse | .................. H02N 1/08 |
| | | | 310/300 |
| 2013/0076202 A1 * | 3/2013 | Naito | ........................ H02N 1/08 |
| | | | 310/300 |
| 2013/0221799 A1 * | 8/2013 | Nakatsuka | ............. H02N 1/004 |
| | | | 310/300 |
| 2013/0229087 A1 * | 9/2013 | Hayashi | ................... H02N 1/08 |
| | | | 310/300 |

(Continued)

OTHER PUBLICATIONS

Kim et al., "Piezoelectric MEMS for energy harvesting," *MRS Bulletin* 37:1039-1050, Nov. 2012.

(Continued)

*Primary Examiner* — Forrest M Phillips
(74) *Attorney, Agent, or Firm* — Seed IP Law Group LLP

(57) ABSTRACT

An inverse electrowetting harvesting and scavenging circuit includes a first substrate having first and second surfaces. An electrode is formed proximate the first surface and includes an insulating layer covering a surface of the electrode. An electromechanical systems device includes a moveable mass extending over the first surface of the first substrate that may be displaced relative to the first substrate in three dimensions responsive to external forces applied to the moveable mass. The movable mass includes a moveable electrode and a conductive fluid is positioned between the insulating layer of the electrode and the movable electrode. Energy harvesting and scavenging circuitry is electrically coupled to the moveable electrode and the other electrode and is configured to provide electrical energy responsive to electrical energy generated by the moveable electrode, conductive fluid and the electrode through the reverse electrowetting phenomena due to movement of the moveable electrode relative to the electrode and to the conductive fluid on top of the electrode.

21 Claims, 17 Drawing Sheets

(56) References Cited

U.S. PATENT DOCUMENTS

| | | | | |
|---|---|---|---|---|
| 2014/0339954 A1* | 11/2014 | Yamakawa | .............. | H02N 1/08 |
| | | | | 310/300 |
| 2015/0061464 A1* | 3/2015 | Park | ..................... | H01L 41/113 |
| | | | | 310/329 |
| 2015/0202656 A1* | 7/2015 | Takahashi | ........... | H01L 41/0986 |
| | | | | 310/300 |
| 2015/0214861 A1* | 7/2015 | Denes | .................... | H02N 2/043 |
| | | | | 417/322 |
| 2015/0340968 A1* | 11/2015 | Inaba | ...................... | B81B 3/007 |
| | | | | 310/300 |
| 2015/0340970 A1* | 11/2015 | Kwon | ................. | H02N 11/002 |
| | | | | 310/300 |

OTHER PUBLICATIONS

Liu et al., "Dielectric materials for electrowetting-on-dielectric actuation," *Microsyst Technol* 16:449-460, 2010.

Mallick et al., "A nonlinear stretching based electromagnetic energy harvester on FR4 for wideband operation," *Smart Materials and Structures* 24:015013, 14 pages.

Krupenkin, Tom et al., "Reverse electrowetting as a new approach to high-power energy harvesting," Nature Communications, Aug. 23, 2011, DOI: 10.1038/ncomms1454, 8 pages.

\* cited by examiner

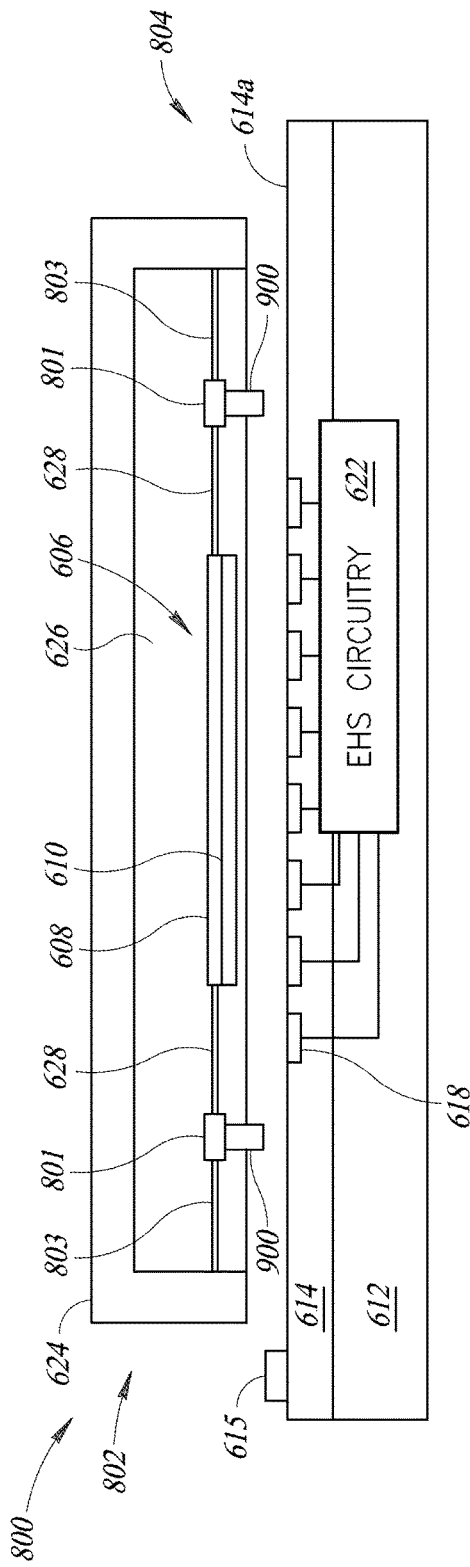
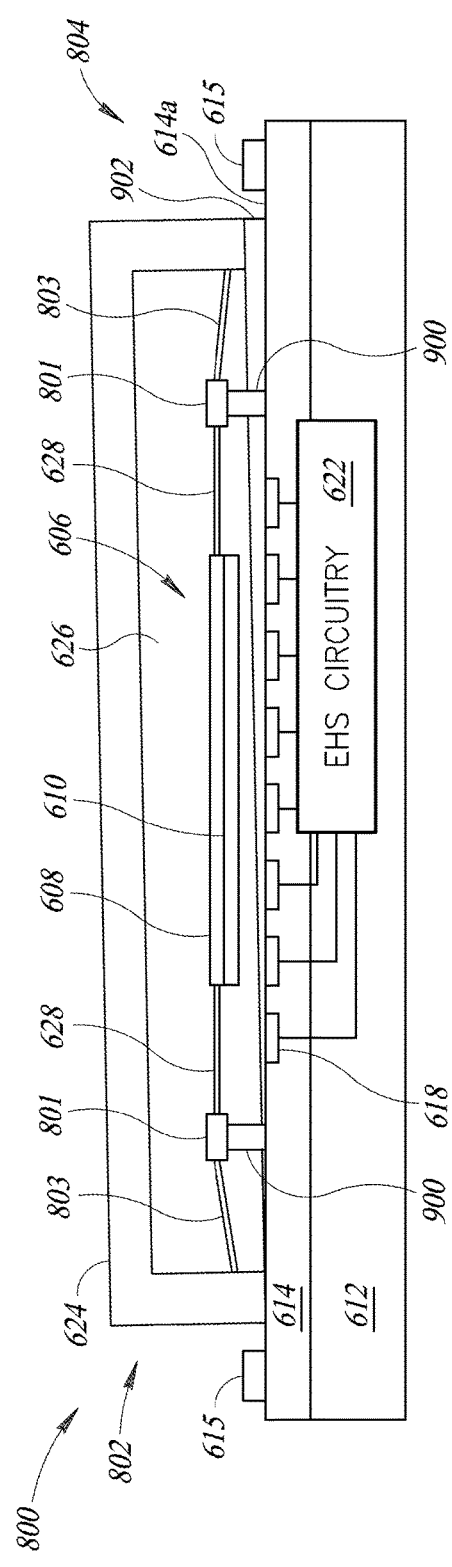
FIG. 9A
FIG. 9B

INVERSE ELECTROWETTING ENERGY HARVESTING AND SCAVENGING METHODS, CIRCUITS AND SYSTEMS

BACKGROUND

Technical Field

The present disclosure relates generally to energy harvesting and scavenging, and more specifically to inverse electrowetting structures and methods for energy harvesting and scavenging.

Description of the Related Art

Energy harvesting and energy scavenging are processes by which electrical energy is derived from an external power source, such as solar power, thermal energy, wind energy, or kinetic energy (motion or vibrations). This electrical energy is captured and stored for use to power an electronic device. The energy source for energy harvesting and scavenging is present as an ambient or background source of energy and is inherently present and thus free, in contrast to large scale electrical power generation where an input fuel like natural gas, oil, coal, or water is used in power generation. The two terms energy harvesting and energy scavenging are many times used interchangeably but are typically distinguished by the nature of the energy source. Energy harvesting is most accurately applied to situations where the external energy source is well known and regularly present, whereas energy scavenging applies where the external energy source is not well known and may be irregular or intermittently present.

Electrowetting may be defined as the utilization of an applied electric field to modify the wetting properties of a surface of a solid material, where wetting is the ability of a liquid to maintain contact with the surface due to molecular interactions when the liquid and solid surface are brought together. Reverse or inverse electrowetting is a process by which the interface between the liquid and solid surface is changed due to movement of the liquid relative to the surface, and these interface changes are utilized to generate electrical energy. The terms electrowetting and reverse or inverse electrowetting, along with the physical phenomenon associated with each of these terms, will be understood by those skilled in the art and thus will not be described in detail herein.

While the inverse electrowetting phenomenon will not be described in detail, to facilitate a better understanding of the present disclosure the inverse electrowetting process will now be briefly described. In the reverse electrowetting process, the liquid is a conductive liquid and the interface is formed between a droplet of the liquid and an electrode that forms the solid surface, with an intermediate insulating layer between the liquid and the electrode. Multiple droplets and interfaces between these droplets and one or more electrodes would actually be utilized but only the interface between a single droplet and electrode is discussed herein by way of example to describe the generation of electrical energy through inverse electrowetting. Air or other gas (or gases) can fill the device, between the liquid (or fluid) and the electrode.

An electrical circuit provides a bias voltage between the droplet and the electrode. External mechanical or kinetic energy, typically in the form of movement of a user where the liquid and electrode are part of a structure contained in a portable electronic device, causes relative movement of the droplets over the surface of the electrode. This movement of the droplet results in a change in an overlap of the droplet with the surface of the electrode, which would typically be a dielectric-film-coated electrode. The change in overlap of the droplet and the surface of the electrode results in a decrease of a total charge that can be maintained at the liquid-solid (i.e., droplet-electrode) interface. As a result of this change in the total charge, extra electrical charge that can no longer be maintained at the droplet-electrode interface flows back through the electrical circuit that is connected to apply the bias voltage to the droplet and the electrode. This extra electrical charge flowing through the electrical circuit results in a current through the electrical circuit that can be used to power external electrical circuitry. In this way the inverse electrowetting process can be used in an energy harvesting and scavenging system.

Energy harvesting and scavenging are utilized to provide a very small amount of electrical energy that may be utilized to supply power to low-power electronic devices. The electronic device is typically a small, wireless device like those contained in portable electronic devices like smart phones or in wearable electronics such as a smart watch, an activity or fitness tracker, and so on. In such a wearable electronic device, a user wears the device and the mechanical or kinetic energy in the form of movement of the user may be harvested or scavenged to generate electrical energy. Inverse electrowetting may be utilized in such energy harvesting and scavenging systems but there is a need for improved techniques and structures that increase the amount of generated electrical energy from such inverse electrowetting systems.

BRIEF SUMMARY

One embodiment of the present disclosure is an inverse electrowetting harvesting and scavenging circuit that includes a first substrate having a first surface and a second surface. An electrode is formed proximate the first surface. An electromechanical systems device includes a moveable mass that extends over the first surface of the first substrate and may be displaced relative to the first substrate in three dimensions responsive to an external force applied to the moveable mass. The movable mass includes a moveable electrode and a conductive fluid or liquid positioned between the movable electrode and the other electrode, with the other electrode being coated with an insulating layer. Energy harvesting and scavenging circuitry is electrically coupled to the moveable electrode and the other electrode and is configured to provide electrical energy responsive to electrical energy generated by the moveable electrode, conductive fluid and the other electrode through the reverse electrowetting phenomena due to conductive fluid deformation caused by movement of the moveable electrode relative to the electrode. The electromechanical systems device may be a microelectromechanical systems (MEMS) device.

BRIEF DESCRIPTION OF THE SEVERAL VIEWS OF THE DRAWINGS

For a better understanding of the present disclosure, embodiments thereof are now described purely by way of non-limiting example, with reference to the attached drawings, wherein:

FIGS. 9A and 9B are cross-sectional views of the EHS device of FIG. 8 showing how springs coupled between the additional frame and the packaging structure along with vertical spacers (pillars) compensate for planarity errors between the moveable mass and the electrode plates of the first semiconductor chip.

DETAILED DESCRIPTION

Figure 1A:
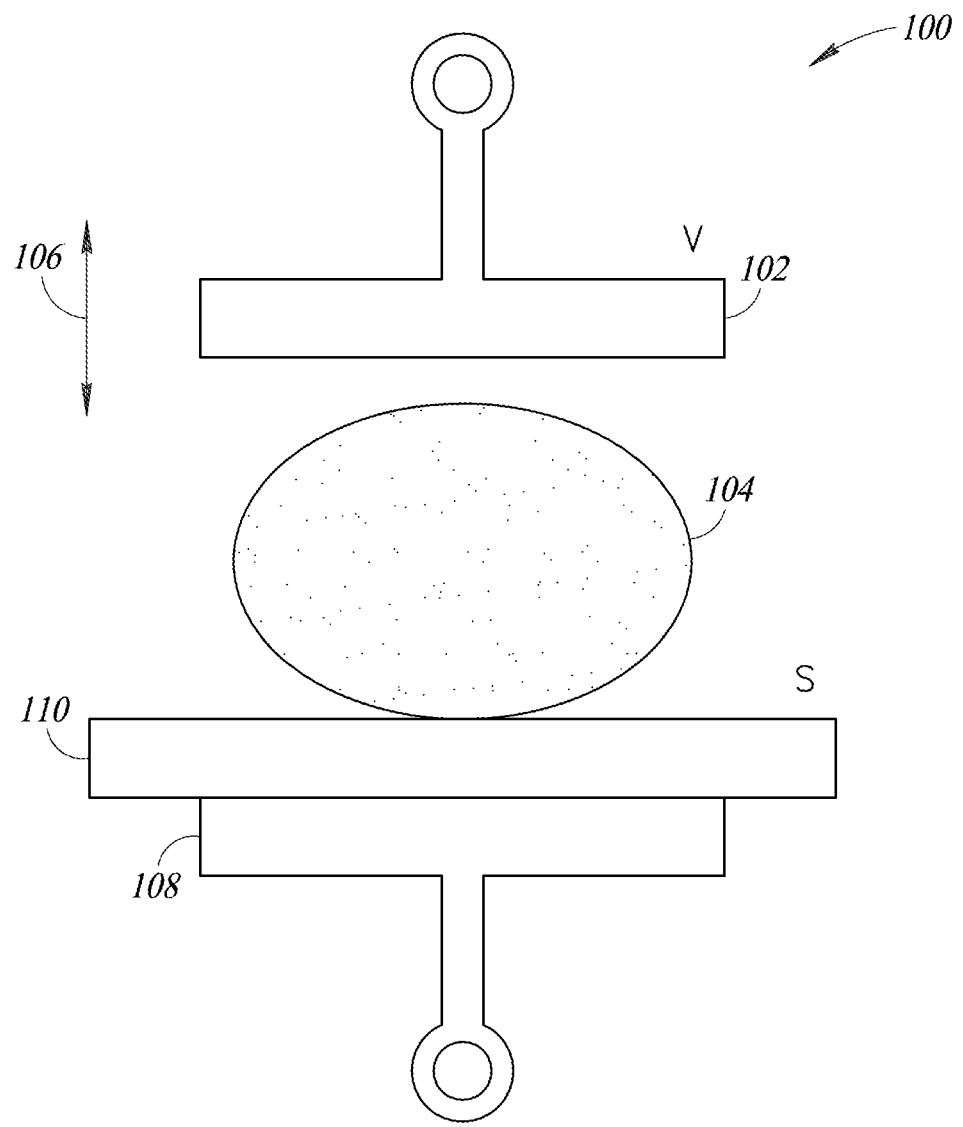
FIGS. 1A-1C are a simplified cross-sectional schematic diagrams of a reverse electrowetting energy harvesting and scavenging (EHS) device that includes at least one electrode that is moveable relative to a second electrode and a conductive liquid on top of the second electrode to generate electrical energy through the phenomena of reverse electrowetting according to embodiments of the present disclosure.
Figure 1B:
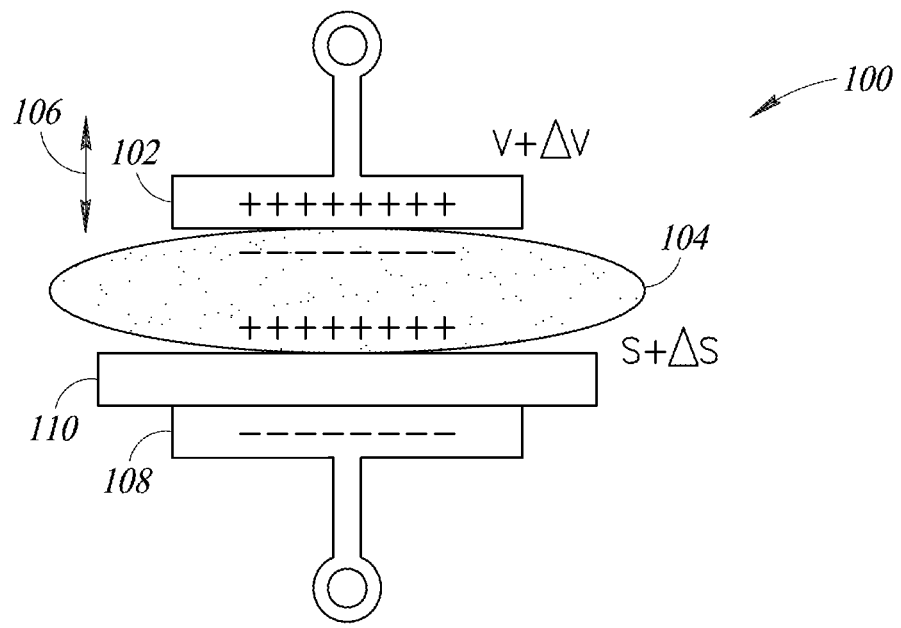
Figure 1C:
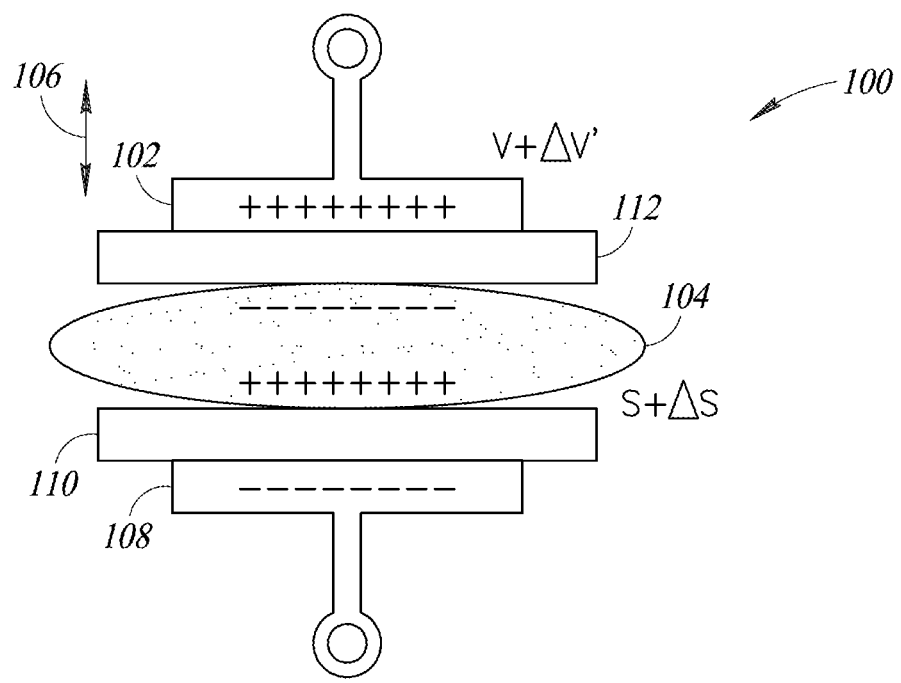

FIGS. 1A-1C are a simplified cross-sectional schematic diagrams of a reverse electrowetting energy harvesting and scavenging (EHS) device 100 that includes a moveable electrode 102 that is moveable relative to a second electrode and to a drop of a conductive fluid or liquid 104 on top of the second electrode to generate electrical energy through the phenomena of reverse electrowetting according to embodiments of the present disclosure. In operation, mechanical energy in the form of motion from an external source, such as from the movement of a person utilizing a portable electronic device containing the EHS device 100, causes movement of the moveable electrode 102 relative to the fixed conductive liquid 104. Most prior reverse electrowetting approaches utilize structures in which from the frame of reference of the electrodes the conductive liquid moves across the surfaces of the electrodes responsive to mechanical energy from an external source and the contact area of liquid and electrodes is changed due to relative motion. In contrast, in the EHS device 100 from the frame of reference of the moveable electrode 102 the moveable electrode moves in a vertical direction 106 as indicated by the arrow 106 responsive to mechanical energy from an external source and the contact area is changed due to a deformation of the liquid.

This approach to forming reverse electrowetting EHS devices enables the utilization of microelectromechanical systems (MEMS) structures containing moveable masses to form the moveable electrode 102 to enhance liquid deformation. In some embodiments, MEMS structures form the moveable electrode 102 that is movable in three-dimensions relative to the conductive liquid 104, as will be described in more detail below. Reverse electrowetting EHS devices including such structures can increase the amount of electrical energy that can be harvested and scavenged through such devices while also allowing conventional semiconductor fabrication methods to be utilized in forming the devices, as will also be discussed in more detail below.

In the present description, certain details are set forth in conjunction with the described embodiments to provide a sufficient understanding of the present disclosure. One skilled in the art will appreciate, however, that embodiments of the disclosure may be practiced without these particular details. Furthermore, one skilled in the art will appreciate that the present disclosure is not limited to the example embodiments described herein, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. The operation of well-known components and/or processes has not been shown or described in detail below to avoid unnecessarily obscuring the present disclosure. Finally, components that are common among the described embodiments are given the same reference numbers or descriptors in the present application even though the detailed operation of such components may vary among embodiments.

Still referring to FIG. 1A, the reverse electrowetting EHS device 100 of FIG. 1A further includes an electrode 108 having a dielectric layer 110 formed on an upper surface of the electrode. The drop of conductive liquid 104 sits on the surface of the dielectric layer 110 and covers a surface area S on the surface of this dielectric layer. Mechanical energy from an external source, such as from the movement of a user of a portable electronic device containing the EHS device, causes movement of the moveable electrode 102, relative to the electrode 108, in the vertical direction 106 in this simplified example. This movement of the moveable electrode 102 relative to the electrode 108 results in a change in the surface area S of the conducive liquid 104 on the surface of the dielectric layer 110, as seen in FIG. 1B. Due to the downward movement of the electrode 102, the conductive liquid 104 now has a surface area (S+ΔS) on the surface of the dielectric layer 110. In the EHS device 100, the moveable electrode 102, conductive liquid 104, dielectric layer 110 and electrode 108 effectively functions as a variable capacitance device, with the capacitance being a function of the surface area of the conductive liquid 104 on the dielectric film 110. As a result of this change in capacitance, the voltage across the electrodes 102, 108 changes as well and the resulting current harvested or scavenged to generate electrical energy. The voltage is shown as being V in FIG. 1A and (V+ΔV) in FIG. 1B. FIG. 1C shows a structure where the EHS device 100 further includes a second dielectric layer 112 formed on the surface of the moveable electrode 102. This second dielectric layer 112 changes the effective capacitance and thus the voltage (V+ΔV') across the electrodes 102, 108 for the same surface area (S+ΔS) of the conductive liquid 104 on the surface of the dielectric layer 110.

Figure 2A:
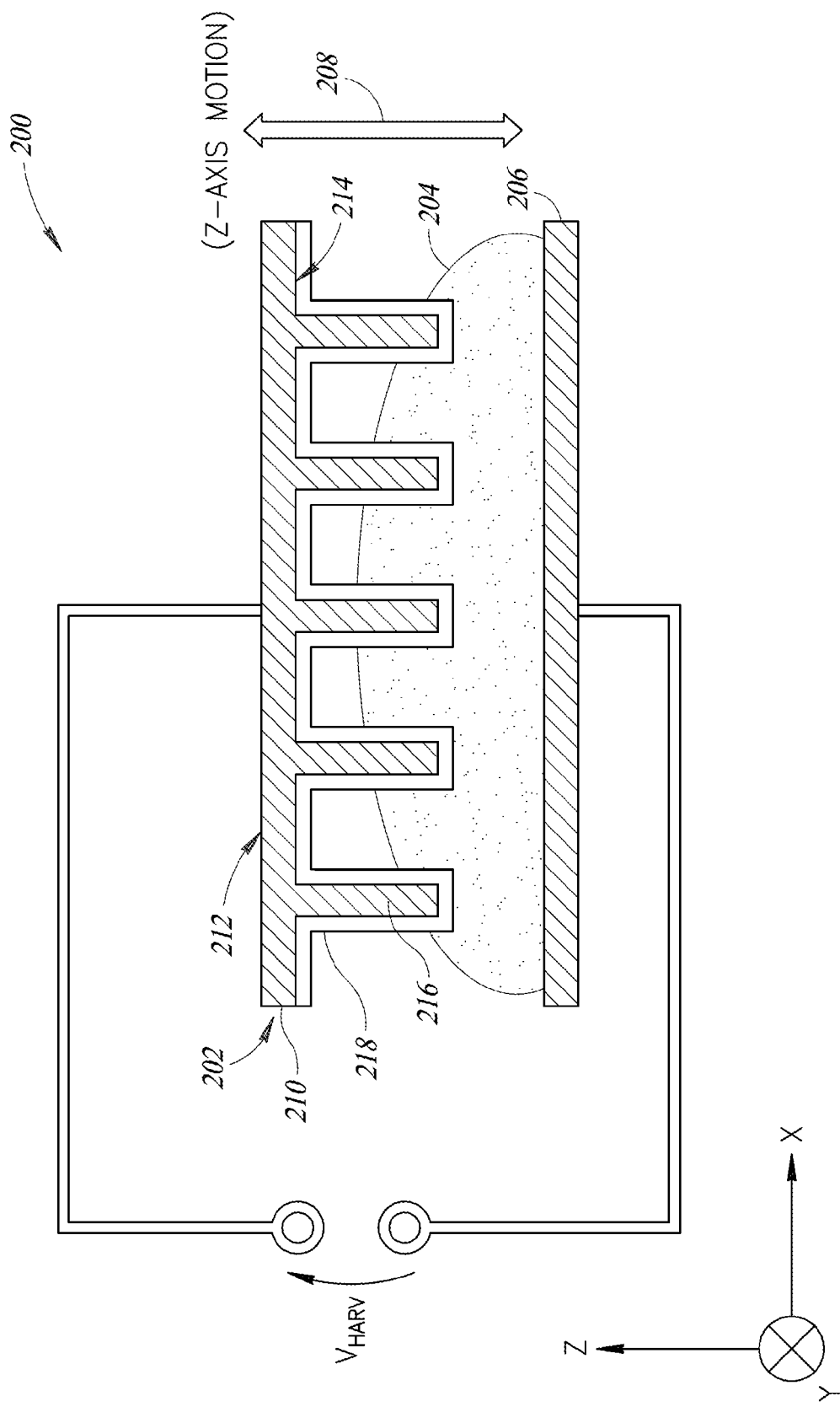
FIGS. 2A and 2B are cross-sectional schematic diagrams of an EHS device including an interdigitated or three-dimensional comb-like electrode and a second electrode that are moveable in three dimensions one relative to the other, with an intermediate conductive fluid on the interdigitated electrode according to one embodiment of the present disclosure.
Figure 2B:
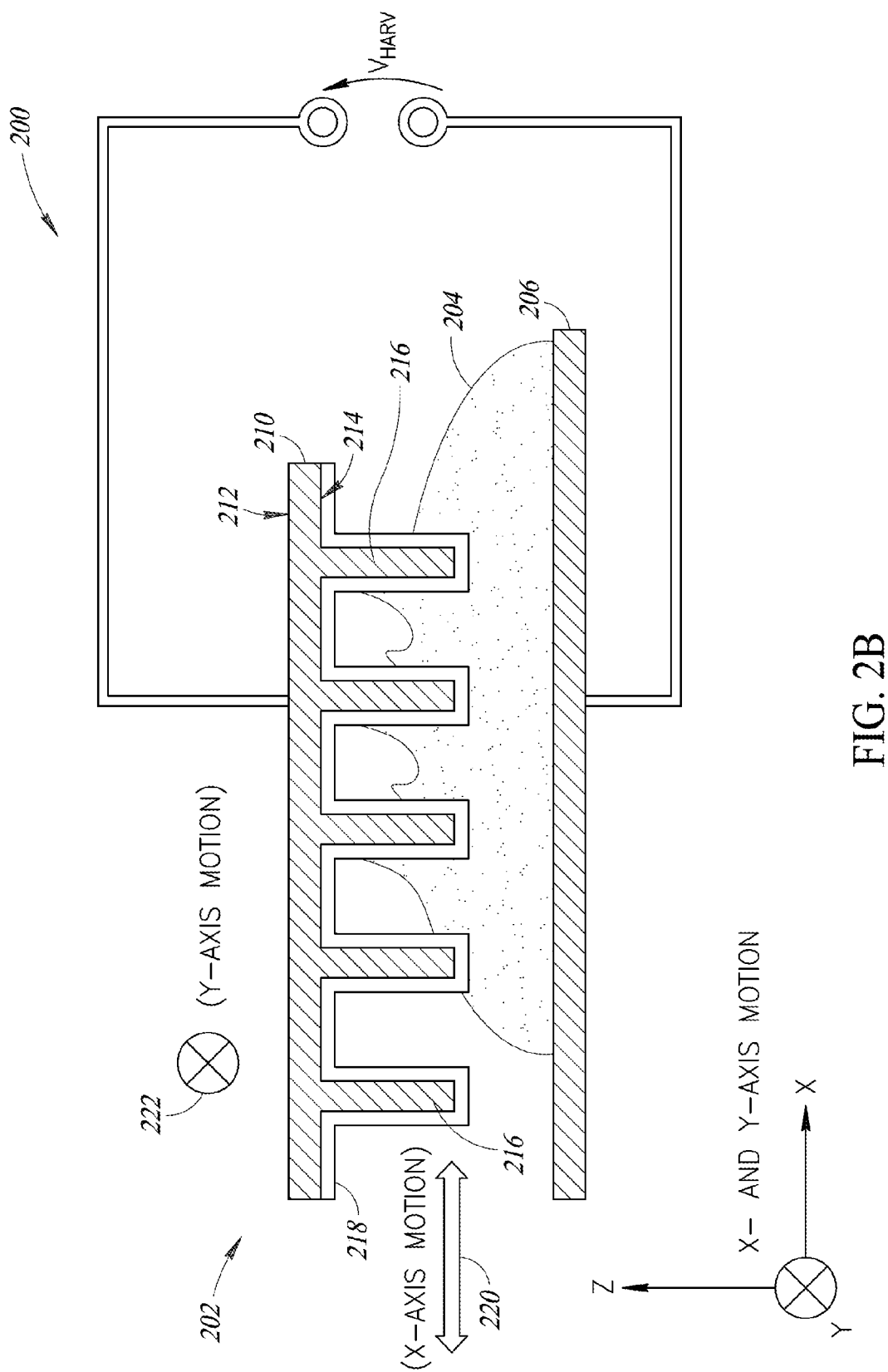

FIGS. 2A and 2B are cross-sectional schematic diagrams of a reverse electrowetting EHS device 200 including a three-dimensional comb-like electrode 202 and an electrode 206 that are moveable one with respect to the other in three dimensions. A conductive fluid 204 on the electrode 206 is in contact with the three-dimensional comb-like electrode according to one embodiment of the present disclosure. FIG. 2A illustrates movement of the electrode 202 relative to the electrode 206 along a Z-axis or in the Z direction as illustrated by arrow 208 relative to the conductive fluid 204 and the three-dimensional comb-like electrode 202. The three-dimensional comb-like electrode 202 includes a horizontal plate 210 having an upper surface 212 and a lower surface 214. A number of vertical projections 216 extend from the lower surface 214 of the horizontal plate 210 towards the electrode 206 and into the conductive fluid 204. Only five vertical projections 216 are shown in FIGS. 2A and 2B merely by way of example and to simply the figures, with embodiments of the electrode 202 including any suitable number of such vertical projections. Embodiments of the EHS device 200 may include a much larger or lower number of such vertical projections 216 formed along the X- and Y-axes 220, 222 on the lower surface 214 of the horizontal plate. A first dielectric film or layer 218 is formed over the lower surface 214 of the horizontal plate 210 and over the surfaces of the vertical projections 216. In another embodiment, a second dielectric layer (not shown) is formed over the upper surface of the electrode 206. FIG. 2B illustrates movement of the electrode 202 relative to the electrode 206 along the X-axis as illustrated by arrow 220 and along the Y-axis 222, which is into and out of the page in the figure. The same structure shown for the interdigitated electrode 202 in the X direction can be designed in the Y direction in a two-dimensional (2D) segmented structure (not shown in FIGS. 2A and 2B). The horizontal plate 210 and vertical projections 216 of the electrode 202 and the other electrode 206 are formed from a suitable material, such as Silicon with at least one metal electrode created on top (not shown).

In operation, a bias voltage source (not shown) supplies a DC bias voltage across the electrodes 202 and 206 while an electronic device containing the EHS device 200 receives mechanical energy in the form of motion from an external source, such as in the form of movement of a person utilizing the portable electronic device. This mechanical energy results in the electrode 202 moving relative to the conductive fluid 204 and the electrode 206. This is illustrated in FIG. 2A with the conductive liquid 204 having the illustrated shape and overlap with the interdigitated electrode 202 moving relative to the electrode 206 in the Z-direction 208, while in FIG. 2B the conductive liquid has the illustrated shape due to movement of the electrode 202 relative to electrode 206 in the X- and Y-directions 220, 222. This change in area or overlap is seen between FIGS. 2A and 2B. For example, the conductive liquid 204 overlaps or covers a portion of the surface of the far left vertical projection 216 in FIG. 2A and does not overlap this vertical projection in FIG. 2B. The change in overlap of the conductive liquid 204 with the four remaining vertical projections 204 to the right is seen between FIGS. 2A and 2B as well. This change in area or overlap of the conductive liquid 204 on the surface of the dielectric layer 218 results in a change in capacitance of the EHS device 200 and a resulting flow of charge that generates a harvested and scavenged voltage VHARV across the electrodes 202, 206 through the reverse electrowetting phenomena as described above. The generated VHARV voltage may then be utilized to power circuitry (not shown) of the electronic device containing the EHS device 200.

Figure 3A:
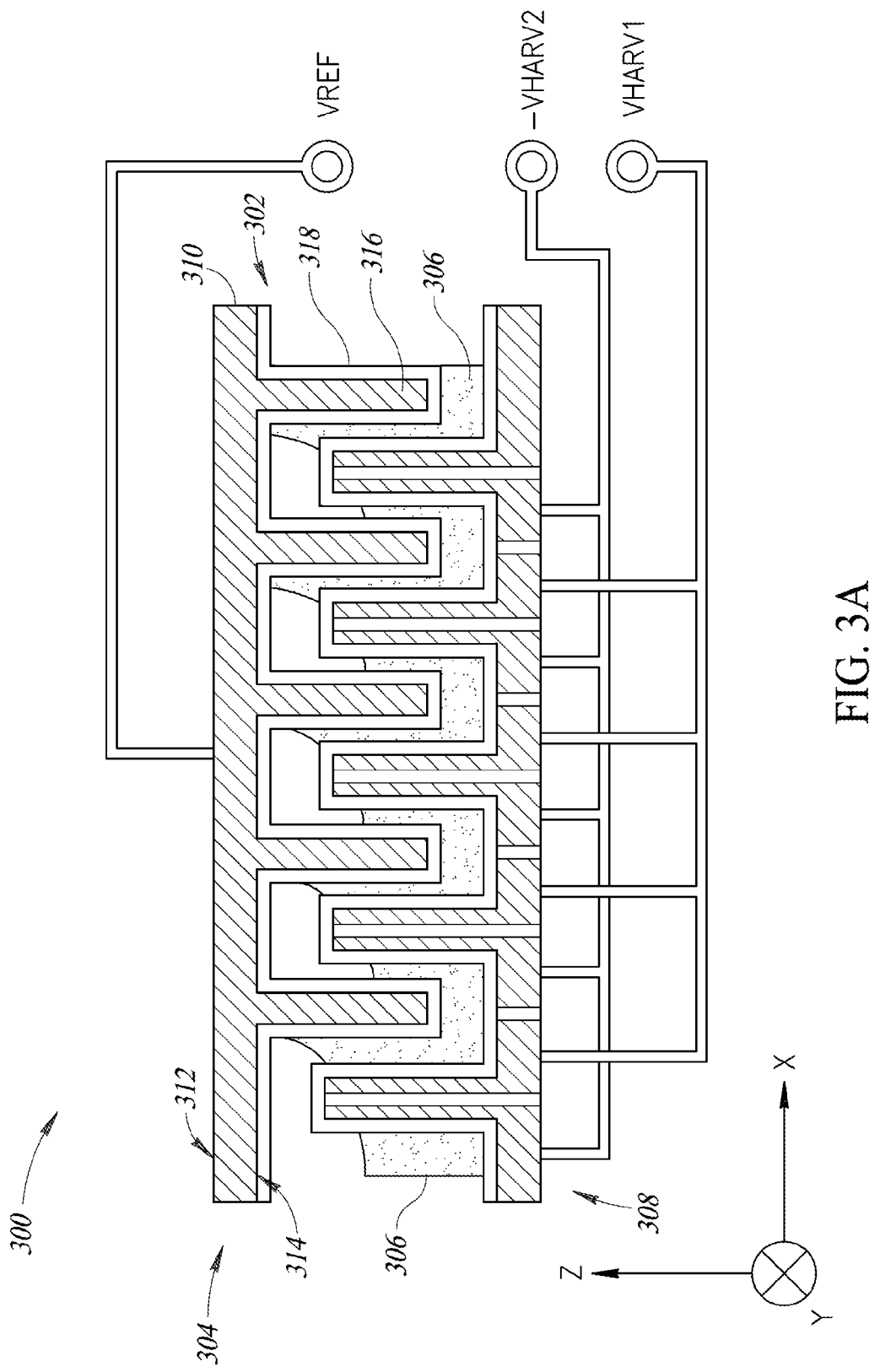
FIG. 3A is a cross-sectional schematic diagram of an EHS device including an interdigitated electrode structure for generating dual voltages relative to a common reference node according to another embodiment of the present disclosure.

FIG. 3A is a cross-sectional schematic diagram of an EHS device 300 including an interdigitated electrode structure 302 for generating dual voltages VHARV1, −VHARV2 relative to a voltage reference node VREF according to another embodiment of the present disclosure. The interdigitated electrode structure 302 includes a three-dimensional comb-like movable electrode 304 that is moveable in three dimensions relative to a conductive fluid 306 on a segmented electrode 308 according to one embodiment of the present disclosure. The three-dimensional comb-like movable electrode 304 is moveable along X-, Y- and Z-axes as shown in the lower left of the figure and has a structure that is the same as or similar to the electrode 202 of FIGS. 2A and 2B in the embodiment of FIG. 3A. Accordingly, the movable electrode 304 includes a horizontal plate 310 having an upper surface 312 and a lower surface 314. A number of vertical projections 316 extend from the lower surface 314 and the lower surface and vertical projections are covered by a first dielectric layer 318.

The vertical projections 316 extend into the conductive fluid 306 and towards the segmented electrode 308. The segmented electrode 308 includes a plurality of electrode segments 320, one of which is shown in and will be described in more detail with reference to FIGS. 3A and 3B. Each electrode segment 320 includes a vertical projection portion 322 that extends upward towards the moveable electrode 304 as seen in FIG. 3A. The vertical projection portions 322 are interdigitated with the vertical projections 316 of the moveable electrode 304. Thus, each vertical projection portion 322 is positioned between adjacent vertical projections 316 of the moveable electrode 304. Each vertical projection 322 is formed by first and second L-shaped electrodes 324 and 326 with a vertical dielectric layer 328 positioned between the vertical-portions of the L-shaped electrodes to electrically isolate the two L-shaped electrodes. A second dielectric layer 330 is formed over an upper surface of each electrode segment 320, and is thus formed over upper surfaces of the L-shaped electrodes and an upper edge surface of the vertical dielectric layer 328. On the ends of each of the horizontal portions of each L-shaped electrode 324, 326 a vertical dielectric layer 332 is formed to electrically isolate each of the L-shaped electrodes from the L-shaped electrode (not shown in FIG. 3B) of the adjacent electrode segment 320.

In operation, responsive to movement of the moveable electrode 304 in three dimensions along the X-, Y- and Z-axes relative to the conductive fluid 306 on the electrode segments 320, the EHS device 300 generates the first dual voltage VHARV1 on the L-shaped electrodes 324 and the second dual voltage −VHARV2 on the L-shaped electrodes 326. Note that in this embodiment, the voltage −VHARV2 is negative relative to the voltage on the reference voltage node VREF while the voltage VHARV is positive relative to the voltage on the reference voltage node. The reference voltage node VREF is coupled to ground GND in one embodiment of the EHS device 300.

Figure 3B:
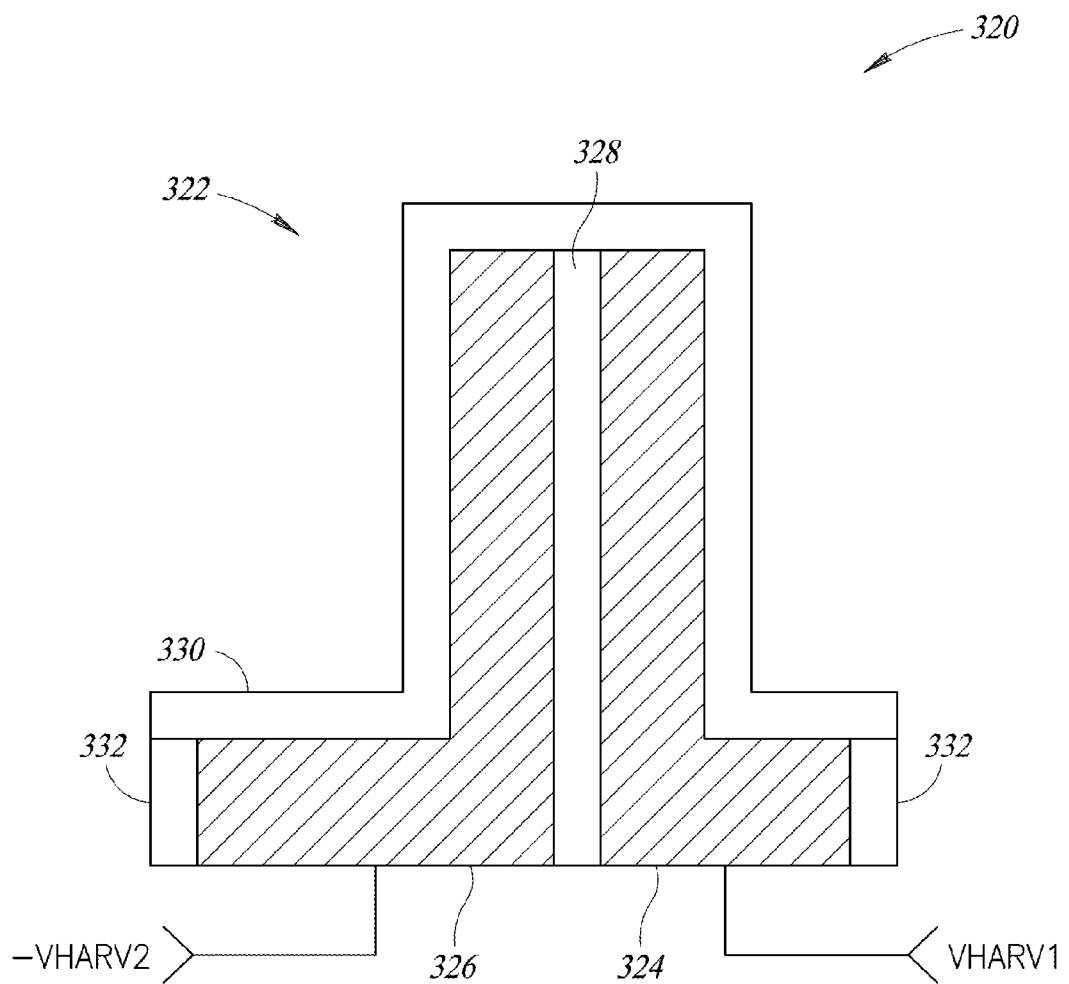
FIG. 3B is a cross-sectional schematic diagram illustrating in more detail one of the electrode segments of FIG. 3A.
Figure 4:
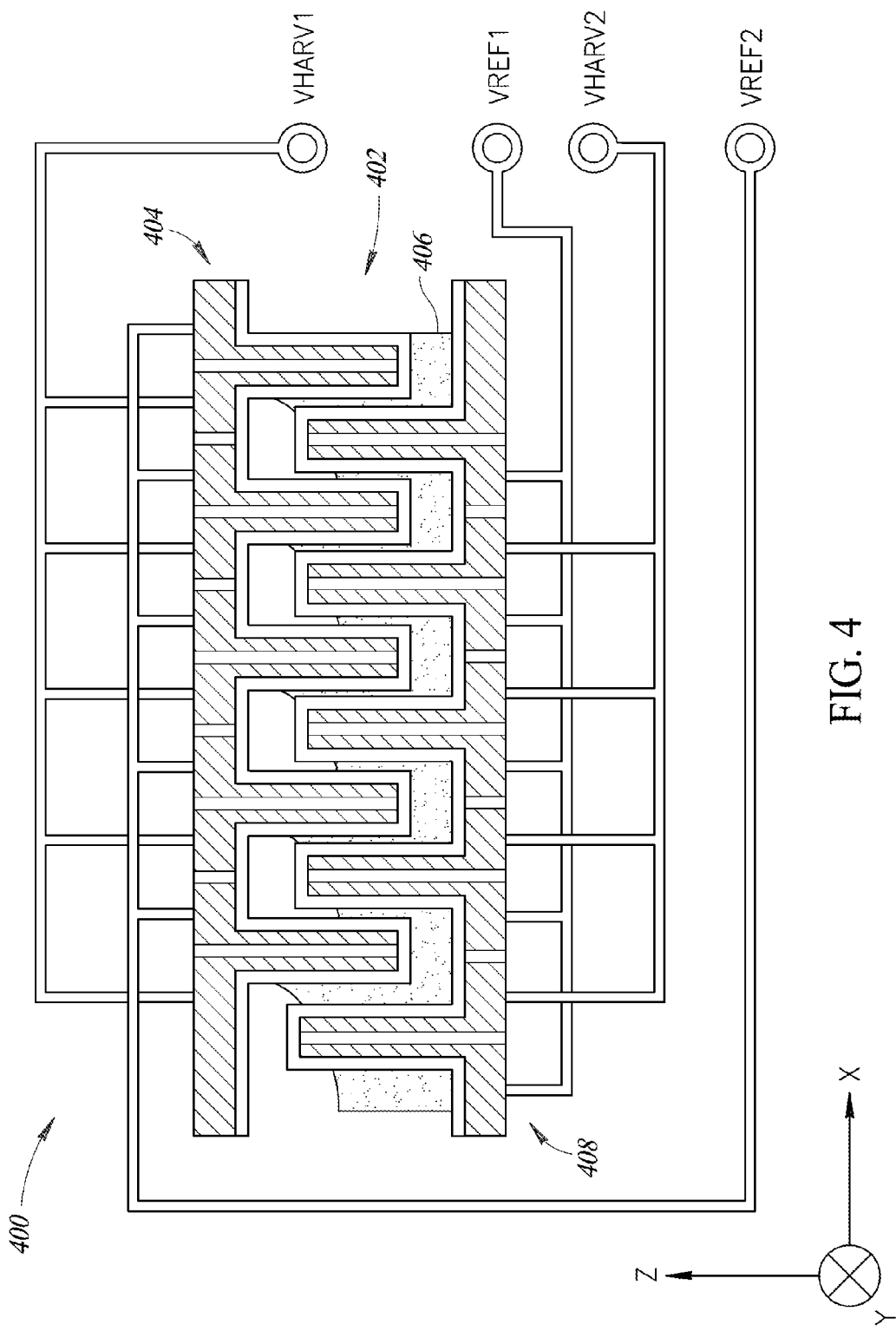
FIG. 4 is a cross-sectional schematic diagram of an EHS device including another interdigitated electrode structure for generating dual voltages, each voltage having an independent reference node according to yet another embodiment of the present disclosure.

FIG. 4 is a cross-sectional schematic diagram of an EHS device 400 including another interdigitated electrode structure 402 for generating dual isolated voltages VHARV1, VHARV2 according to yet another embodiment of the present disclosure. Each voltage VHARV1, VHARV2 is isolated in that each voltage has an independent voltage reference node VREF1, VREF2 instead of the common reference voltage node VREF as in the EHS device 300 of FIGS. 3A and 3B. In the EHS device 400 components 406-432 correspond to the components 306-332 previously described with reference to FIGS. 3A and 3B and thus will not again be described in detail with reference to FIG. 4.

The difference between the EHS device 400 and the EHS device 300 of FIGS. 3A and 3B is that the EHS device 400 includes a moveable electrode 404 that also has a segmented structure as described for the segmented electrode 308 of FIGS. 3A and 3B. Thus, in the EHS device 400 both the moveable electrode 404 and the electrode 408 have a segmented structure. In the embodiment of FIG. 4, the structure of each of the moveable electrode 404 and the electrode 408 has the same segmented structure as for the electrode 308 of FIGS. 3A and 3B. Thus, each of the electrode segments for the electrodes 404 and 408 has the same structure as the electrode segment 320 shown in FIG. 3B. Other embodiments of the EHS device 400 include different segmented electrode structures for one or both the electrodes 404 and 408. In operation, responsive to movement of the moveable electrode 404 in three dimensions along the X-, Y- and Z-axes relative to the conductive fluid 406 on the electrode 408, the EHS device 400 generates a first isolated voltage VHARV1 relative to the first reference voltage node VREF1 and a second isolated voltage VHARV2 relative to the second reference voltage node VREF2. Voltage signals VHARV1 and VHARV2, for example, may be managed independently to improve the generation efficiency.

Figure 5:
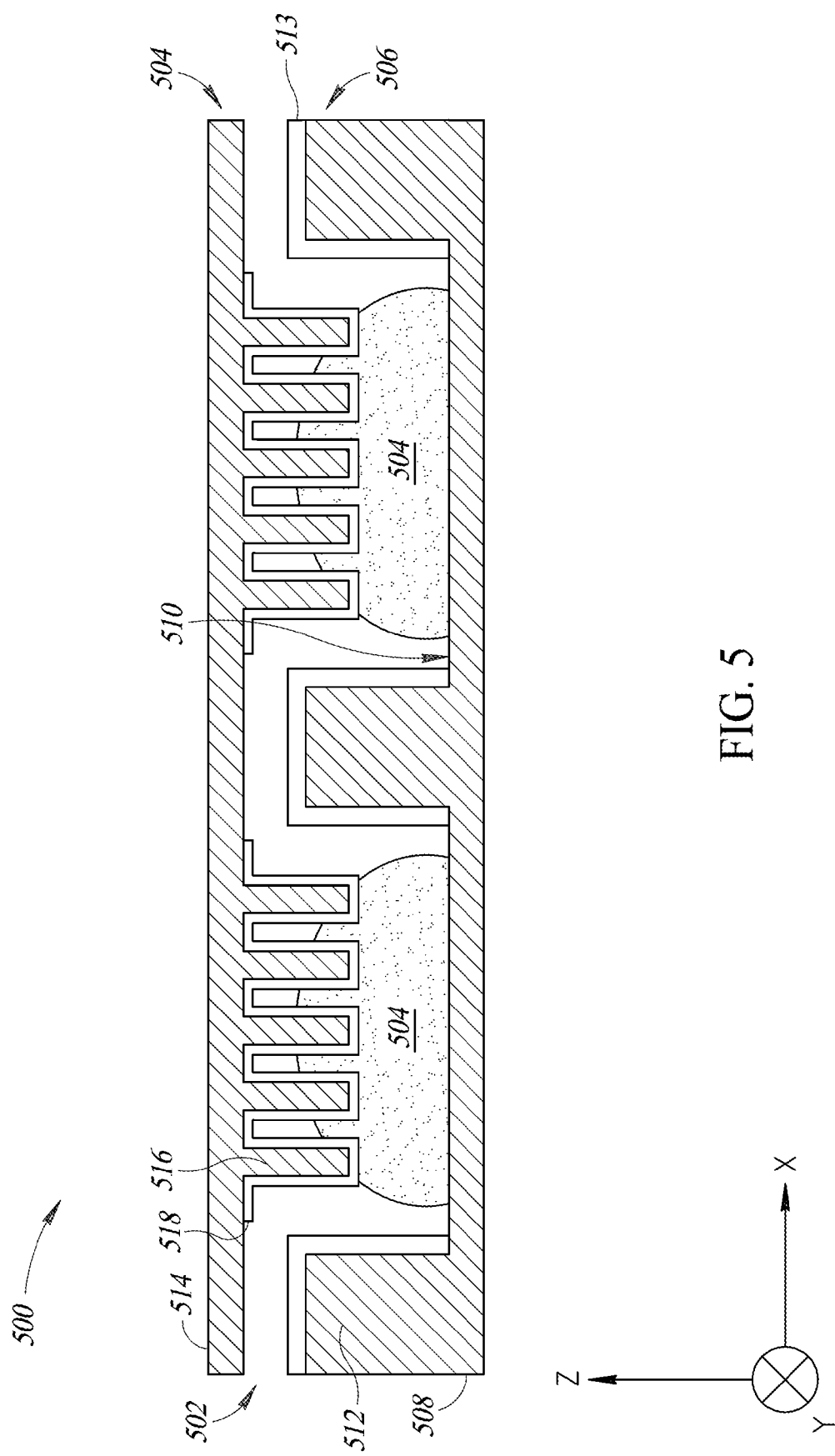
FIG. 5 is a cross-sectional schematic diagram of an EHS device including yet another electrode structure having vertical projections on a lower one of the electrodes that function both as stoppers and to confine conductive fluid on this lower electrode between adjacent vertical projections according to a still further embodiment of the present disclosure.

FIG. 5 is a cross-sectional schematic diagram of an EHS device 500 including yet another electrode structure 502 having vertical projections on a lower one of the electrodes that function to confine conductive fluid 503 on this lower electrode between adjacent vertical projections according to a still further embodiment of the present disclosure. The electrode structure 502 includes an electrode 504 having a structure similar to the structure of the electrode 202 of FIGS. 2A and 2B. The electrode structure 502 further includes an electrode 506 having a horizontal plate 508 with an upper surface 510 and fluid confinement projections 512 formed spaced apart on the upper surface of the horizontal plate. A dielectric layer 513 covers each of the fluid confinement projections 512. The fluid confinement projections 512 function both as stoppers to prevent electrodes from crashing one against the other and to contain or confine a particular volume of conductive liquid 503 between adjacent fluid confinement projections 512. Thus, in the embodiment of FIG. 5 the conductive fluid 503 on the left is confined between the leftmost fluid confinement projection 512 and the middle fluid confinement projection while the conductive fluid on the right is confined between the middle fluid confinement projection and the rightmost fluid confinement projection.

The electrode 504 has a structure similar to the structure of the electrode 202 of FIGS. 2A and 2B as mentioned above. Thus, the electrode 504 includes a horizontal plate 514 with vertical projections 516 extending from a lower surface of the horizontal plate and a dielectric layer 518 covering the vertical projections and portions of the horizontal plate. The vertical projections 516 are arranged spaced apart on the horizontal plate 514 so that they extend between adjacent fluid confinement projections 512 and into the conductive fluid 503 confined between such adjacent fluid confinement projections. In operation, responsive to movement of the electrode 504 relative to the electrode 506 in three dimensions along the X-, Y- and Z-axes and relative to the conductive fluid 503 on the electrode 506, the EHS device 500 generates a voltage VHARV (not shown in FIG. 5) across the electrodes 504 and 506. The electrodes 504 and 506 can have different structures, similar to what previously described for FIG. 3A and FIG. 4.

Figure 6:
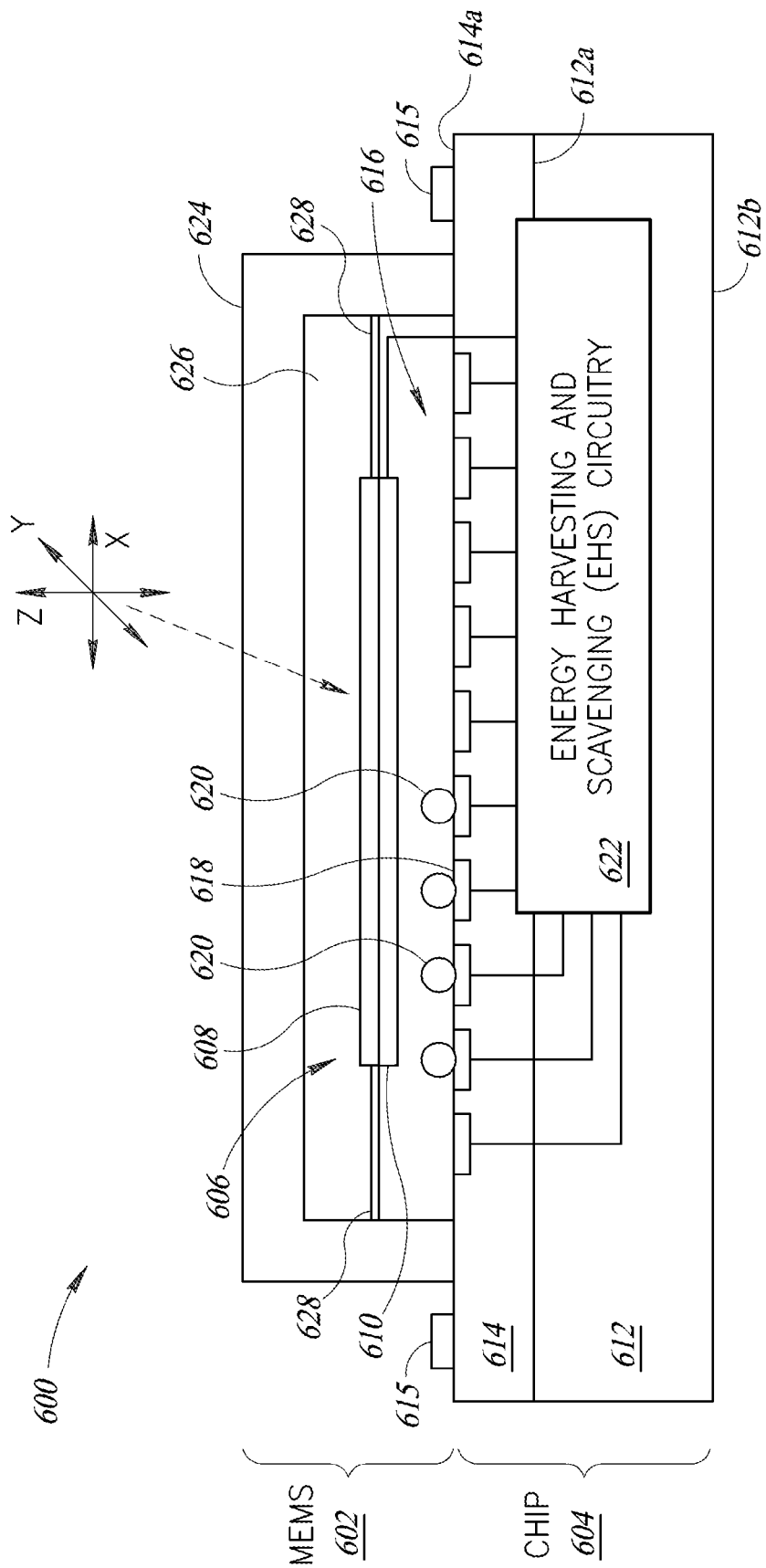
FIG. 6 is a cross-sectional schematic diagram of a reverse electrowetting EHS device including a microelectromechanical systems (MEMS) device and a first semiconductor chip according to one embodiment of the present disclosure.

FIG. 6 is a cross-sectional schematic diagram of a reverse electrowetting EHS device 600 including a microelectromechanical systems (MEMS) device 602 and a first semiconductor chip 604 according to one embodiment of the present disclosure. The MEMS device 602 includes the moveable electrode portion of the EHS device 600, such as in the EHS devices 100-500 described above with reference to FIGS. 1-5, while the other electrode portion of the EHS device is formed in the first semiconductor chip 604. The MEMS device 602 includes a moveable mass 606 that forms the moveable electrode portion of the EHS device 600. The moveable mass 606 include a support layer 608 on which a moveable electrode 610 is formed. The moveable electrode 610 has the structure of any of the moveable electrodes of the EHS devices 100-500 described above with reference to FIGS. 1-5. The moveable electrode 610 is formed from a suitable conductive material and may include a suitable dielectric layer or layers as part of the moveable electrode, such as in the embodiments of FIG. 1C and FIGS. 2-5.

The first semiconductor chip 604 may be, for example, an application specific integrated circuit (ASIC) or a system-on-a-chip (SOC) type integrated circuit or chip. The chip 604 includes a substrate 612 made of semiconductor material such as silicon, for example. The substrate 612 has a first face 612a and an opposite second face 612b. Formed on the first face 612a of the substrate 612 is a structural layer 614, and may be made of dielectric on the first face 612a of the substrate. The structural layer 614 includes an upper surface 614a on which bonding pads 615 are formed to provide for the electrical connection of the EHS device 600 to external circuitry (not shown). Inside the structural layer 614 may be present at least a level of conductive traces along with required dielectric layers to form an electrode 616 of the EHS device 600. In the illustrated embodiment, the electrode 616 includes a number of individual electrode segments 618 formed in the structural layer 614.

The specific structure of the individual electrode segments 618 varies in different embodiments of the EHS device 600, and could correspond to the structures for the electrodes described for the EHS devices 100-500 of FIGS. 1-5. In the embodiment of FIG. 6, each of the electrode segments 618 is a conductive plate. In other embodiments, each electrode segment 618 includes a conductive portion along with a suitable dielectric layer or layers as part of the electrode segment, as in the embodiments of FIGS. 1-5. A volume of conductive fluid 620 is then placed on each of the electrode segments 618 such that the conductive fluid is positioned between the electrode segments and the moveable electrode 610. Although the electrode 616 is formed in the structural layer 614 in the embodiment of FIG. 6, in other embodiments the electrode may be formed in the substrate 612, or in both the substrate and the structural layer.

The EHS device 600 further includes energy harvesting and scavenging (EHS) circuitry 622 formed in the substrate 612 or, alternatively, in the structural layer 614, or in both the substrate and structural layer. The EHS circuitry 622 could also be formed in neither the substrate 612 nor the structural layer 614, but instead may be formed external to the chip 604 and be electrically coupled to the chip. In the embodiment of FIG. 6, the EHS circuitry 622 is electrically coupled to each of the electrode segments 618 forming the electrode 616. The EHS circuitry 622 is also electrically coupled to the moveable electrode 610. In operation, the EHS circuitry 622 supplies a DC bias voltage across the moveable electrode 610 and electrode 616 and captures electrical generated responsive to mechanical energy causing three-dimensional motion of the moveable mass 606 and thereby the moveable electrode relative to the conductive liquid 620 and electrode 616, as will be described in more detail below.

The MEMS device 602 includes a packaging structure 624 that is set directly on the top surface 614*a* of the structural layer 614 in the embodiment of FIG. 6. Alternatively, the MEMS device 602 can be set facing the top surface 614*a* of the structural layer 614 but separated from the structural layer by means of one or more coupling layers, for example a layer of adhesive material (not shown). In this way, the packaging structure 624 of the MEMS device 602 is fixed with respect to the first semiconductor chip 604. The packaging structure 624 defines an internal cavity 626 of the MEMS device 602 where the internal cavity houses the moveable mass 606 that is suspended within the internal cavity by means of a supporting structure 628.

The supporting structure 628 suspends the moveable mass 606 within the internal cavity 626 such that the moveable mass is mobile or capable of moving in three dimensions. This three-dimensional movement of the moveable mass 606 is represented through X, Y and Z axes shown in upper center portion of FIG. 6. In other embodiments the moveable mass 606 is moveable in fewer than three dimensions, but three-dimensional movement of the moveable mass is preferable since this should result in a larger capture of electrical energy responsive to movement of the moveable mass, as will be appreciated by those skilled in the art. The packaging structure 624 and the supporting structure 628 may be made of semiconductor material such as silicon in the embodiment of FIG. 6, but in general the packaging structure and the supporting structure as well as the support layer 608 of the moveable mass 606 may be made of materials other than a semiconductor material. A suitable material would be selected, at least in part, on the basis of desired characteristics of flexibility and strength of the material for use in formation of the packaging structure 624, the supporting structure 628 and possibly the support layer 608 as well.

In the embodiment of FIG. 6 the MEMS device 602 is positioned on the semiconductor chip 604, but the MEMS device may be mounted to or attached to other devices as well. Instead of the chip 604, for example, the MEMS device 602 could be positioned on a substrate, in which for example the electrode 616 may be created, such as the substrate 612 made of a semiconductor material or a substrate made of another material, for example ceramic, glass or a printed circuit board (PCB) material that may be rigid or flexible. In such an embodiment, the EHS circuitry 622 could be formed in the substrate 612 or external to the substrate. In addition, although the embodiment of FIG. 6 includes the MEMS device 602, other electromechanical systems (EMS) devices could be utilized in the EHS device 600 in place of the MEMS device 602 in other embodiments of the present disclosure. Such an EMS device could be a discrete system formed from discrete components or parts also created using different materials and assembled together, as opposed to the MEMS device 602 formed in a semiconductor substrate using semiconductor device fabrication technologies, as will be appreciated by those skilled in the art.

In operation of the EHS device 600, external forces produce stresses that cause movement of the moveable mass 606 relative to the chip 604 and thereby relative to the conductive liquid 620 and the electrode segments 618. The movement of the moveable mass 606 and thereby the moveable electrode 610 cause a change in surface overlap of the conductive liquid 620 on the moveable electrode, generating electrical energy across the moveable electrode and the electrode 616 through the reverse electrowetting phenomena as previously described.

Figure 6A:
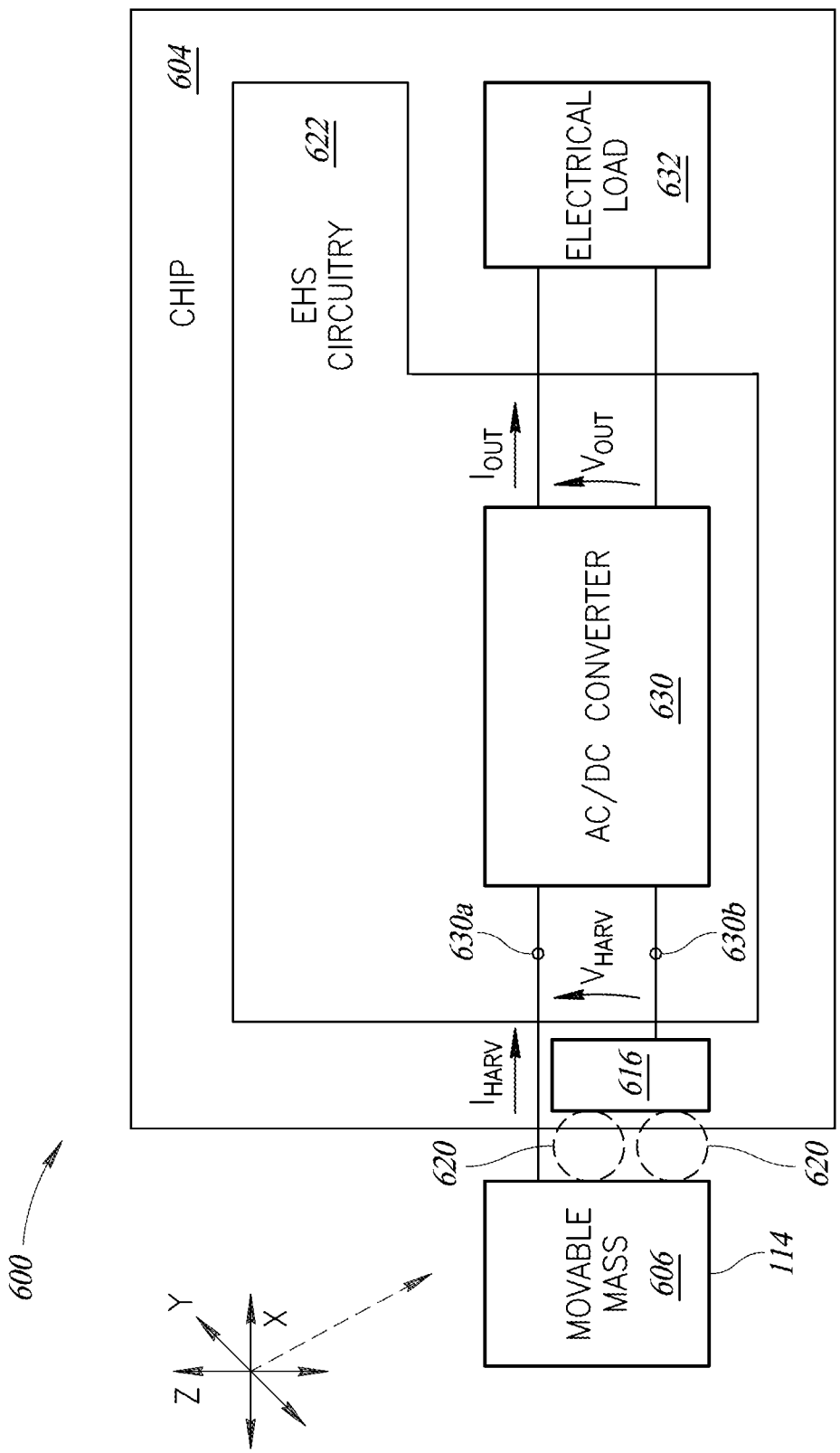
FIG. 6A is a functional diagram illustrating the operation of the reverse electrowetting EHS device of FIG. 6.

FIG. 6A is a functional diagram illustrating in more detail the operation of the EHS device 600 of FIG. 6. External forces applied to an electronic device including the EHS device 600 result in movement of the moveable mass 606 relative to the electrode 616 and conductive liquid 620. This movement of the moveable mass 606 can occur in three dimensions, namely along and X axis, Y axis, and Z axis as previously mentioned and as once again represented through these three axes shown in the upper left portion of FIG. 6A. This movement of the moveable mass 606 results in changes in the overlap of the area of the conductive liquid 620 on the moveable mass (i.e., on the moveable electrode 610) to thereby generate a harvested and scavenged voltage current IHARV and voltage VHARV across the moveable mass (i.e., moveable electrode 610) and the electrode 616 through the reverse electrowetting phenomena.

The EHS circuitry 622 may include an AC/DC converter 630 having a first terminal 630*a* coupled to the moveable mass 606 (i.e., the moveable electrode 610) and a second terminal 630*b* coupled to the electrode 616. The movement of the moveable mass 606 generates the current IHARV and voltage VHARV which vary as a function of time due to the movement of the moveable mass relative to the conductive fluid 620. The AC/DC converter 630 converts this time varying current IHARV and voltage VHARV into a DC output voltage VOUT and current IOUT that can then be used to provide power to an electrical load 632. Thus, the AC/DC converter 630 contained in the EHS circuitry 622 generates the DC output voltage Vout and DC output current Iout from the time varying voltage VHARV and current IHARV. The electrical load 632 may be contained in the first semiconductor chip 604 as shown in FIG. 6A or may be external to the chip, and for example it may be another electronic system or an energy storage device like a battery or a super-capacitor. One skilled in the art will understand various suitable circuits that may be utilized for forming the AC/DC converter 630. For example, the AC/DC converter 630 may include rectification circuitry that rectifies the time varying or AC voltage and current VHARV, IHARV to generate a rectified voltage that is then applied to a capacitive circuit to filter this rectified voltage and store electrical energy to thereby provide the output voltage Vout and current Iout from the AC/DC converter. The term "AC" is used to indicate a signal or quantity that is alternating or varying over time while the term "DC" is used to indicate a signal or quantity that is relatively constant over time, as will be appreciated by those skilled in the art. Thus, the time varying voltage and current VHARV, IHARV are AC signals while the output voltage Vout and current Iout are DC signals.

Figure 6B:
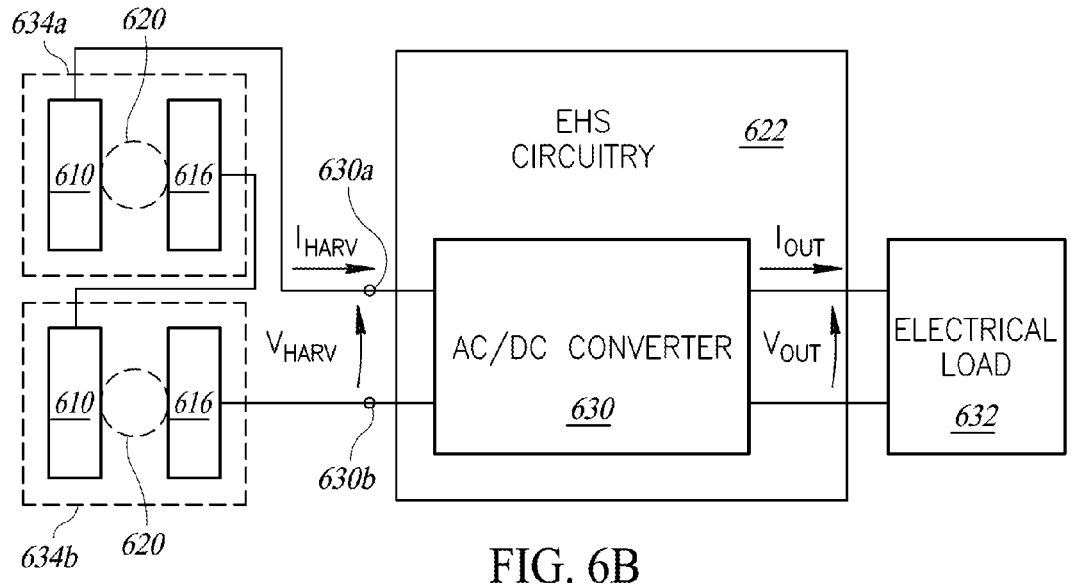
FIG. 6B is a functional and schematic diagram illustrating another embodiment of the EHS circuitry and MEMS device of FIG. 6 in which two reverse electrowetting structures are coupled in series.

FIG. 6B is a functional and schematic diagram illustrating another embodiment of the EHS circuitry 622 and MEMS device 602 of FIG. 6 in which two reverse electrowetting structures 634a and 634b are coupled in series. In this embodiment, the movable mass 606 includes two moveable electrodes 610, each moveable electrode operable with a corresponding electrode 616. Each electrode 616 would be formed from a group of electrode segments 618 formed in or on the structural layer 614 of the first semiconductor chip 604. The electrode 616 of the reverse electrowetting structure 634a is coupled to the moveable electrode 610 of the reverse electrowetting structure 634b. The AC/DC converter 630 is contained in the EHS circuitry 622 and the terminal 630a is coupled to the moveable electrode 610 of the structure 634a while the terminal 630b is coupled to the electrode 616 of the structure 634b. Once again, movement of the movable masses 610 in the structures 634a and 634b results in generation of the time varying voltage VHARV and current IHARV are generated responsive to the movement and the based on the reverse electrowetting phenomena. The AC/DC converter 602 once again generates a DC output voltage Vout and a DC output current Iout from the time varying or AC voltage VHARV and current IHARV from the structures 634a and 634b and supplies this output voltage and current to drive the electrical load 632.

Figure 6C:
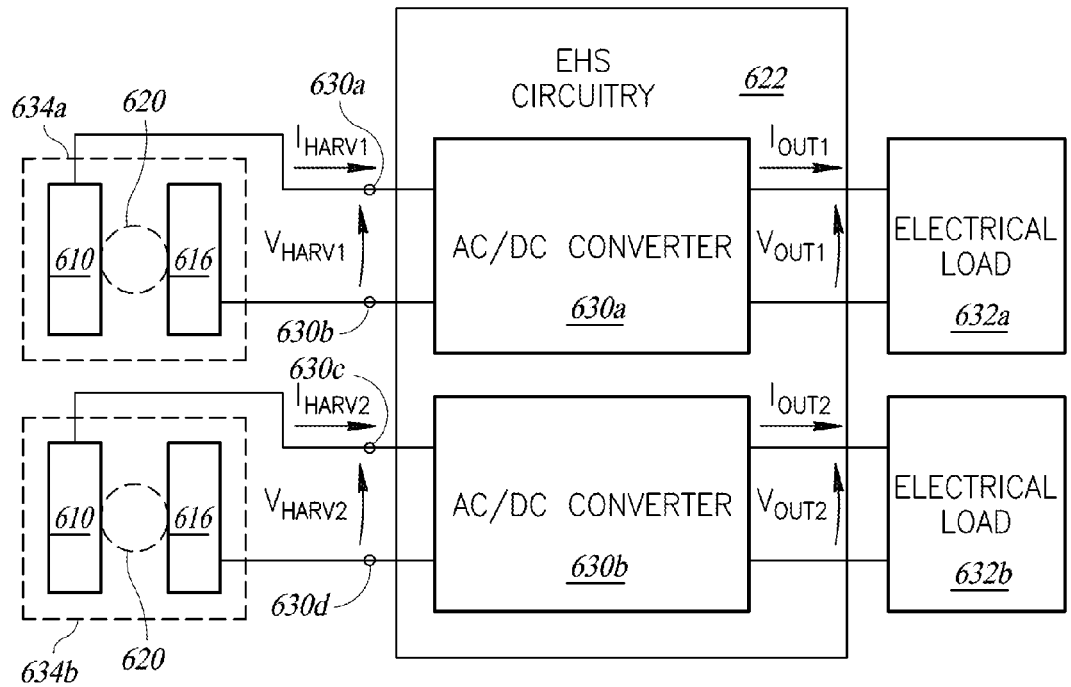
FIG. 6C is a functional and schematic diagram illustrating another embodiment of the EHS device of FIG. 6 including independent reverse electrowetting structures for generating dual independent voltages.

FIG. 6C is a functional and schematic diagram illustrating another embodiment of the EHS device 600 of FIG. 6 including independent reverse electrowetting structures 634a, 634b for generating dual independent voltages VHARV1, VHARV2 and currents IHARV1, IHARV2. The first reverse electrowetting structure 634a includes a movable mass 610 coupled to terminal 630a of a first AC/DC converter 630a contained in the EHS circuitry 622. The AC/DC converter 630a generates a DC output voltage Vout1 and current Iout1 that drive a first electrical load 632a. Similarly, the second reverse electrowetting structure 634b includes a moveable mass 610 coupled to terminal 630c of a second AC/DC converter 630b that generates a DC output voltage Vout2 and current Iout2 that drive a second electrical load 632b. In a variation (not shown), the reverse electrowetting structures 634a and 634b may be coupled in parallel to a single AC/DC converter 630. In another variation (not shown), the AC/DC converters 630a, 630b may be coupled in series or in parallel to a single electrical load 632. The reverse electrowetting structures 634a and 634b are formed in one embodiment by the moveable electrode 404 and electrode 408 in the embodiment of FIG. 4.

Figure 7:
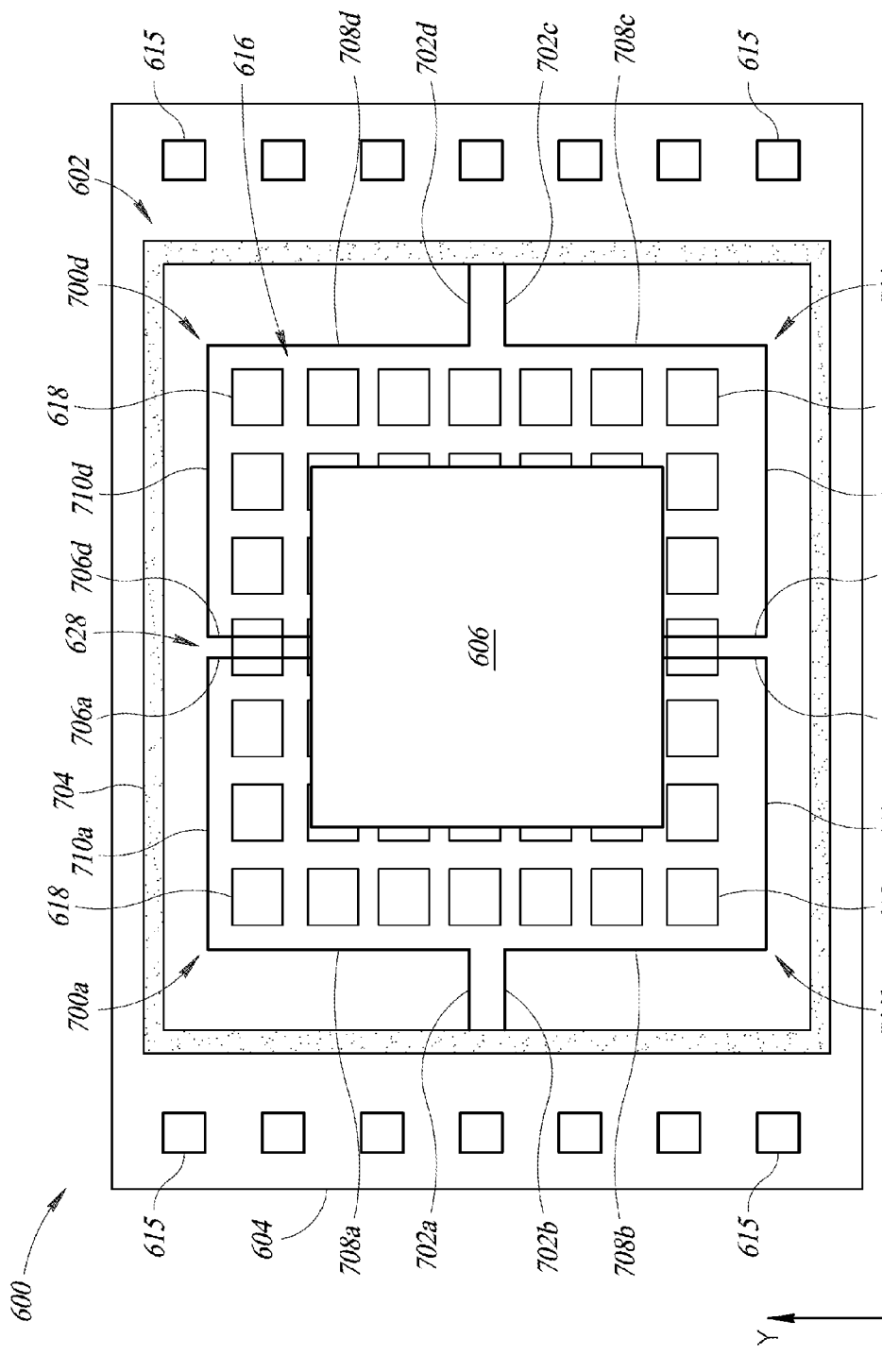
FIG. 7 is a top view showing in more detail the supporting structure of the moveable mass in the MEMS device of FIG. 6 according to one embodiment of the present disclosure.

FIG. 7 is a top view showing in more detail the supporting structure 628 of the moveable mass 606 in the MEMS device 602 of FIG. 6 according to one embodiment of the present disclosure. The top view of FIG. 7 shows components contained within the internal cavity 626 of the MEMS device 602 with the top portion of the packaging structure 624 removed to expose the internal cavity. In the embodiment of FIG. 7, the supporting structure 628 has four springs or balancers or arms 700a-700d. Each arm 700a-700d has a first end 702a-702d coupled to a respective wall 704 of the packaging structure 624 (that is a frame in the section here shown in FIG. 7), where the walls 704 along with the top (not shown) form the internal cavity 626 of the MEMS device 602. Each arm 700a-700d further includes a second end 706a-706d coupled to the moveable mass 606. More specifically, although not expressly shown in FIG. 7, the second ends 706a-706d are coupled to the support layer 608 of the moveable mass 606. The bonding pads 615 are also shown in FIG. 7 although only selected ones of these bonding pads are labeled with reference number 615 merely to simplify the figure.

In the embodiment of FIG. 7, the moveable mass 606 is a plate having a square shape but in other embodiments different shapes may be utilized. Obviously the shape of supporting structure 628 depends on the shape of moveable mass 606. The respective first ends 702a and 702b of the arms 300a and 300b are coupled to the same wall 704 of the packaging structure 624. Likewise, the respective first ends 702c and 702d of the arms 700c and 700d are coupled to the same wall 704 of the packaging structure 624, where this wall is diametrically opposite to the 704 to which the first ends 702a, 702b of the arms 700a, 700b are coupled. Thus, the first ends 702a, 702b of the arms 700a and 700b are coupled to the wall 704 on the left of FIG. 7 and the first ends 702c, 702d of the arms 700c and 700d are coupled to the wall 704 on the right of FIG. 7. The respective second ends 706a and 706d of the arms 700a and 700d are coupled to the same side of the moveable mass 606, which is the top side in FIG. 7. The respective second ends 706b and 706c of the arms 700b and 700c are coupled to the same side of the moveable mass 706, which is the bottom side of the moveable mass 606. Thus, the second ends 706a and 706d are coupled to a side of the moveable mass 606 that is diametrically opposite to the side of the moveable mass to which the second ends 706b and 706c are coupled.

Each arm 700a-700d further includes between the corresponding first ends 702a-702d and second ends 706a-706d respective first arm portions 708a-708d and second arm portions 710a-710d having preferred directions of extension orthogonal to one another. With reference to the axes represented in the lower left portion of FIG. 7, each of the first arm portions 708a-708d has a preferred direction of extension along the Y axis while the second arm portions 710a-710d each has a preferred direction of extension along the X axis.

In operation, when the moveable mass 606 is subjected to an external force, bending or stretching of angles between the various portions 708, 710 and ends 702, 706 of the arms 700 occurs based upon the direction and orientation of the external force applied to the moveable mass. For example, in the case of a Y-directed force with an orientation from bottom to top in FIG. 7, such as due to inertial reaction to the force of gravity along the Y axis applied to the EHS device 600, then the angles formed by second end 706b and second arm portion 710b and the second end 706c and second arm portion 710c are stretched due to the external force. Conversely, in this situation the angles formed by the first arm portion 708b and the second arm portion 710b and the first arm portion 708b and the first end 702b are bent. The same is true for the angles formed by the first arm portion 708c and the second arm portion 710c and the first arm portion 708c and the first end 702c, namely these angles are bent in this situation.

In a similar way, if the moveable mass 606 is subjected to an external force acting along the X axis, the moveable mass 606 is set in motion along the X axis through the supporting structure 628 in a manner similar to that just described for a Y-directed force. The supporting structure 628 also allows movement of the moveable mass 606 along the Z axis in an analogous manner. The same is true for external forces having components along multiple axes at the same time, such as along both the X axis and along the Y axis, for example, with the supporting structure 628 allowing movement of the moveable mass 606 responsive to the external force.

The arms 700a-700d and the moveable mass 606 may be produced in the same etching step during manufacturing of the MEMS device 602. More specifically, the arms 700a-700d and the support layer 608 may be formed through the same etching step. In this case, the support layer 608 of the moveable mass 606 and the arms 700a-700d are made of the same material, and no discontinuities are present between the support layer and the arms. The moveable mass 606 includes the moveable electrode 610 attached to the support layer 608. The moveable electrode 610 has a suitable structure as previously discussed, and may be formed on or attached to the support layer 608 through any suitable techniques, as will be appreciated by those skilled in the art.

Figure 8:
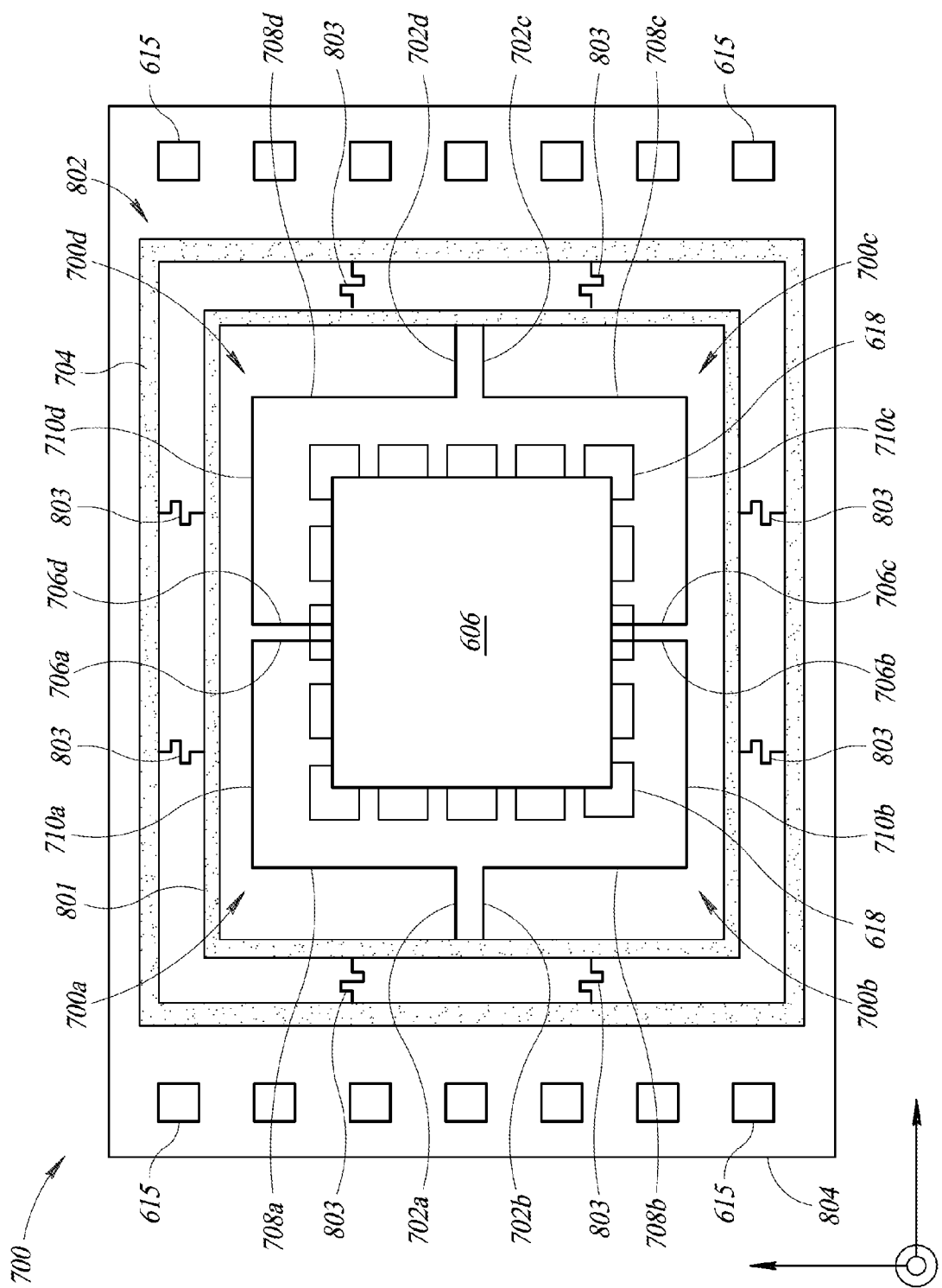
FIG. 8 is a top view of a reverse electrowetting EHS device that provides compensation for planarity errors between the moveable mass of the MEMS device and the other electrode segments of the semiconductor chip according to a further embodiment of the present disclosure.

FIG. 8 is a top view of a reverse electrowetting EHS device 800 that provides compensation for planarity errors between a moveable mass of a MEMS device 802 and electrode segments of a semiconductor chip 804 according to a further embodiment of the present disclosure. Components of the EHS device 600 of FIGS. 6 and 7 that are the same as or similar to corresponding components in the EHS device 800 have been given the same reference numbers and will not again be described in detail with reference to FIG. 8.

In the embodiment of FIG. 8, instead of the first ends 702a-d of the arms 700a-d being coupled to a respective wall 704 of the packaging structure 624 (FIG. 6), the MEMS device 802 includes an additional frame 801 positioned between the first ends and the corresponding wall of the packaging structure. The first ends 702a-d of the arms 700a-d are coupled to a corresponding wall of the additional frame 801 and the additional frame is, in turn, coupled through resilient arms or springs 803 to the walls 704 of the packaging structure 624. This structure allows for capacitive fine tuning or planarity error compensation of the EHS device 800, as will now be described in more detail with regard to FIGS. 9A and 9B.

FIGS. 9A and 9B are cross-sectional views of the EHS device 800 of FIG. 8 showing how the springs 803 coupled between the additional frame 801 and the packaging structure 624 along with vertical spacers 900 allow for the compensation of planarity errors between the moveable mass 606 and the electrode plates 618 of the electrode 616 formed in the first semiconductor chip 804. In FIG. 9A, the MEMS device 802 is shown above the semiconductor chip 804 prior to being bonded or attached to the chip. The moveable mass 606 is ideally parallel to the upper surface 614a of the structural layer 614 of the chip 804 so that the moveable electrode 610 is the same distance from each of the electrode segments 618 of the electrode 616.

When bonding the MEMS device 802 to the upper surface 614a of the structural layer 614 of the chip 804, the MEMS device may be attached such that the moveable mass 606 may be no longer parallel to upper surface 614a. This is illustrated in FIG. 9B, where more of an adhesive material 902 used to attach the MEMS device 802 to the chip 804 (or eventual other root causes of missed planarity) is present on the right hand side of the EHS device 800 as shown. As a result, if no additional frame 801 (FIG. 8), springs 803 and vertical spacers 900 were present, the moveable electrode 610 on the movable mass 606 would not be parallel to the upper surface 614a. This would result in different portions of the moveable electrode 610 being different distances from the electrode segments 618, which is undesirable, because it introduces a difference in performance among several EHS devices 800 due to the assembly process. Instead, as seen in FIG. 9B the frame 801, springs 803 and vertical spacers 900 maintain the moveable mass 606 parallel to the surface 614a even in the presence of the uneven adhesive material 902 that resulted when the MEMS device 802 is attached to chip 804. This is true because the additional frame 801 and vertical spacers 900 position the moveable mass 606 properly while the springs 803 flex as required to allow for variations in the ideal position of the packaging structure 624 resulting (as an example) from the process of attaching the MEMS device 802 to the chip 804.

Vertical spacers 900 may be used to electrically couple the moveable mass 606 and the moveable electrode 610 with the chip 804 for example by means of pads (not shown) on upper surface 614a. Moreover, using these pads and vertical spacers 900 it may be possible also to test electrically the correct alignment of the moveable mass 606 and the chip 804 for example using a current that can flow from a first one of the vertical spacers 900 (e.g., the vertical spacer on the left in FIG. 9B) and a second one of the vertical spacers 900 (e.g., the vertical spacer on the right in FIG. 9B).

Figure 10:
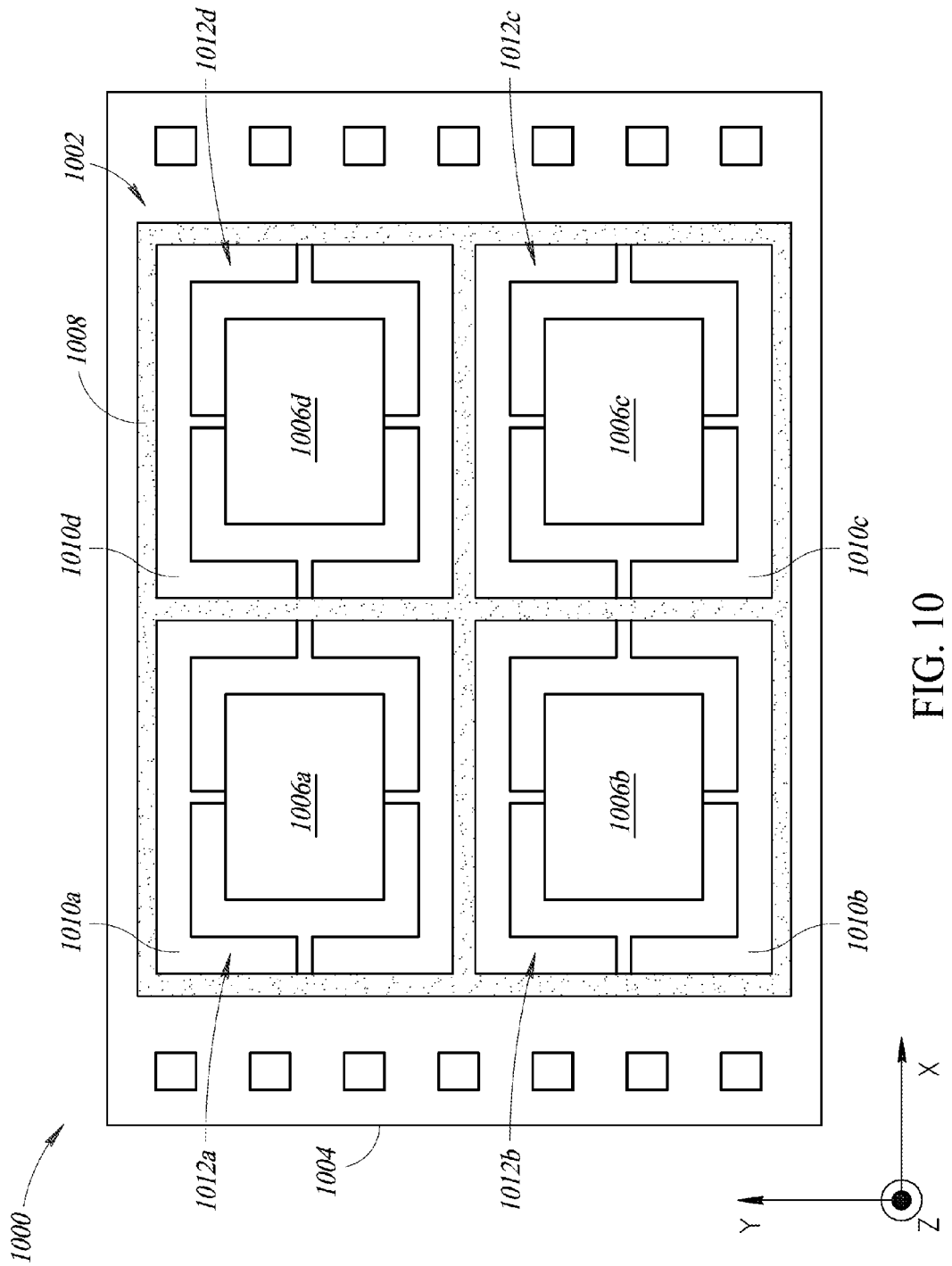
FIG. 10 is a top view of a reverse electrowetting EHS device including a MEMS device having multiple moveable masses according to another embodiment of the present disclosure.

FIG. 10 is a top view of a reverse electrowetting EHS device 1000 including a MEMS device 1002 and semiconductor chip 1004 where the MEMS device includes multiple moveable masses 1006a-d according to yet another embodiment of the present disclosure. In the EHS device 1000 multiple energy harvesting and scavenging structures are replicated in order to increase the amount of electrical energy harvested and/or scavenged by the EHS device. The inclusion of multiple energy harvesting and scavenging structures increases the energy simply by having more such structures generating energy and may increase captured energy by selectively capturing energy based on the spatial and frequency characteristics of the mechanical energy that causes movement of the moveable masses by increasing the efficiency of EHS device 1000, as will be explained in more detail below with reference to FIG. 11.

The MEMS 1002 includes a frame 1008 having walls that form four internal cavities 1010a-d, each internal cavity housing a corresponding movable mass 1006a-d. Each movable mass 1006a-d is coupled to corresponding walls of the frame 1008 through a respective supporting structure 1012a-d. The specific structure of the support structures 1012a-d and of the moveable masses 1006a-d, as well as the structure of the corresponding electrode structure (not shown in FIG. 10) for each moveable mass that is formed in the chip 1004, may vary in different embodiments of the EHS device 1000. For example, in one embodiment each moveable mass 1006a-d has the same structure as the moveable mass 606 of FIGS. 6 and 7 while the supporting structures 1012a-d have the same structure as the supporting structure 628 of FIGS. 6 and 7. In this embodiment, the structure of the electrode (not shown) corresponding to each moveable mass 1006*a-d* is the same as the electrode 616 (or electrode segments 618 forming the electrode 616) of FIGS. 6 and 7. In other embodiments, the structure of the moveable mass 1006*a*, supporting structure 1012*a-d* and electrode may have any suitable structure, such as structures for these components as previously described for the embodiments of FIGS. 1-9.

Figure 11:
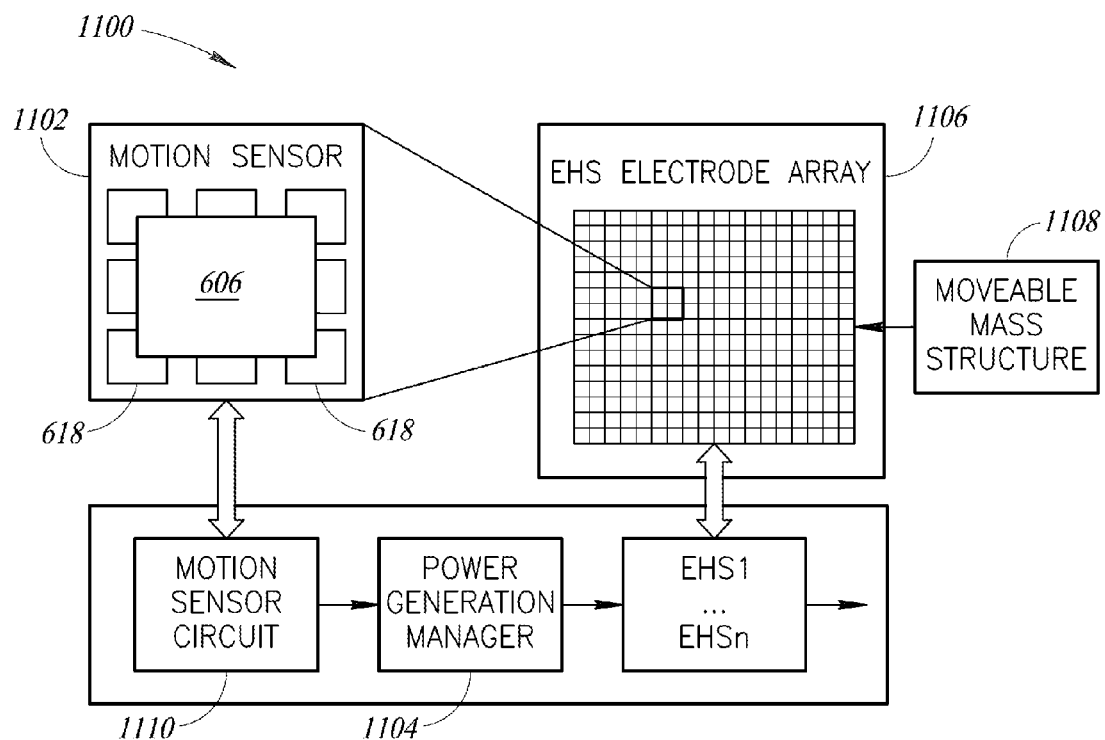
FIG. 11 is a functional and schematic diagram of an intelligent reverse electrowetting EHS device including a motion sensor and intelligent power generation management circuitry according to yet another embodiment of the present disclosure.

FIG. 11 is a functional and schematic diagram of an intelligent reverse electrowetting EHS device 1100 including a motion sensor 1102 and intelligent power generation management circuitry 1104 according to yet another embodiment of the present disclosure. The intelligent EHS device 1100 includes an EHS electrode array 1106, which is represented in the figure through an array of squares, each square in the array representing an individual electrode structure or a portion of such electrode structure. A movable mass structure 1108 includes one or more moveable masses that are not expressly shown in FIG. 11, with each of these moveable masses being positioned relative to a corresponding individual electrode structure in the electrode array 1106.

The motion sensor 1102 generates a signal responsive to movement of the moveable mass or masses in the moveable mass structure 1108. A motion sensor circuit 1110 senses the signal generated by the motion sensor 1102 and processes this signal to detect the direction of movement of the moveable mass or masses in the moveable mass structure 1108. The motion sensor 1102 can be a separate component, such as an accelerometer or gyroscope, which is suitable attached to moveable mass structure 1108 to detect the direction of movement. Alternatively, the motion sensor 1102 can be formed from a portion of the electrode array 1106 and moveable mass structure 1108. Such an embodiment is illustrated in FIG. 11. In this sample embodiment of the motion sensor 1102, the motion sensor includes a single moveable mass, such as the moveable mass 602 of FIG. 6-8 or 1006 of FIG. 10. The motion sensor 1102 also includes a number of electrode segments, such as the electrode segments 618 of FIGS. 6-8. In this embodiment the motion sensor 1102 is formed by the moveable mass 602 and several electrode segments 618, which means that this moveable mass and electrode segments are not utilized in capturing electrical energy but instead are used to form the motion sensor. Other embodiments of the motion sensor 1102 are of course possible, for example increasing the number of moveable masses and increasing or decreasing the number of electrode segments. In another embodiment, not shown, the moveable mass 606 and electrode segments 618 could be formed in the corners of EHS electrode array 1106 to increase sensitivity of the motion sensor 1102.

The voltage generated across each electrode segment 618 and the moveable mass 606 will vary as a function of the direction of movement of the moveable mass relative to the electrode segments. The motion sensor circuit 1110 processes these voltages generated across respective electrode segments 618 and the movable mass 606 to detect the direction of movement of the moveable mass, as will be appreciated by those skilled in the art. Note that the moveable mass 606 may also include multiple segments, such as where the moveable mass 606 has the structure of the moveable mass 404 of FIG. 4, or multiple liquid drops deposited on the electrodes.

In operation, the motion sensor circuit 1110 senses the signal generated by the motion sensor 1102 to detect the direction of movement of the moveable mass structure 1108. The motion sensor circuit 1110 provides the detected direction of movement of the movable mass structure 1108 to the power generation management circuitry 1104. Utilizing the detected direction of movement of the movable mass structure 1108, the power generation management circuitry 1104 then controls a plurality of EHS circuits EHS1-EHSN that are coupled to the electrode array 1106 and moveable mass structure 1108 to capture electrical energy from selected electrodes and moveable masses in the array 1106 and moveable mass structure 1108. Each of the EHS circuits EHS1-EHSN corresponds to the EHS circuit 622 of FIG. 6 in one embodiment, as will be discussed in more detail below with reference to FIG. 12.

In this way, the intelligent EHS device 1100 may optimize or improve the power generation of the device by harvesting or scavenging energy from electrodes or electrode segments that are generating the most electrical energy due to the direction of movement of the movable mass structure 1108. The power generation management circuitry 1104 may in this way decide the best combination or coupling of the outputs from selected electrodes or electrode segments and inputs-outputs of selected EHS circuits EHS1-EHSN that will maximize the generated electrical energy in agreement with the direction of movement of the movable mass 1108 contained thereon relative to the EHS array 1106.

Figure 12:
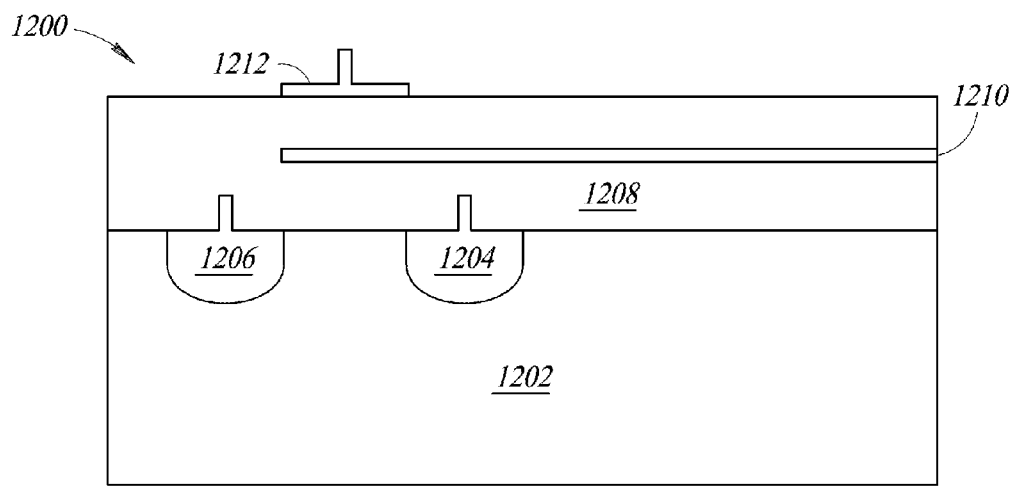
FIG. 12 is a cross-sectional schematic diagram of a floating gate metal-oxide-semiconductor (MOS) transistor that can be utilized to apply the voltage bias to the reverse electrowetting EHS devices of FIGS. 1-11 according to another embodiment of the present disclosure.

FIG. 12 is a cross-sectional schematic diagram of a Floating gate Avalanche MOS (metal-oxide-semiconductor) (FAMOS) transistor 1200 that may be utilized for voltage biasing in the reverse electrowetting EHS devices of FIGS. 1-11 according to another embodiment of the present disclosure. The FAMOS transistor 1200 is formed in a substrate 1202 and includes a drain region 1204 and source region 1206 formed in the substrate. A dielectric layer 1208 is formed on the substrate 1202 with an extended floating gate 1210 formed in the dielectric layer and a gate electrode 1212 formed on the dielectric layer. In operation or during a manufacturing process, a voltage bias is applied by injecting electrical charge into the Extended Floating Gate 1210 of the FAMOS 1200, or into a Floating Gate of a standard FAMOS, connected to a capacitor plate (not shown). This increases energy harvesting efficiency as expected from reverse electrowetting physics, improving electrostatic induction due to injected electrical charges into the Extended Floating Gate. Multiple FAMOS transistors with common Floating Gates can speed up charging.

Figure 13:
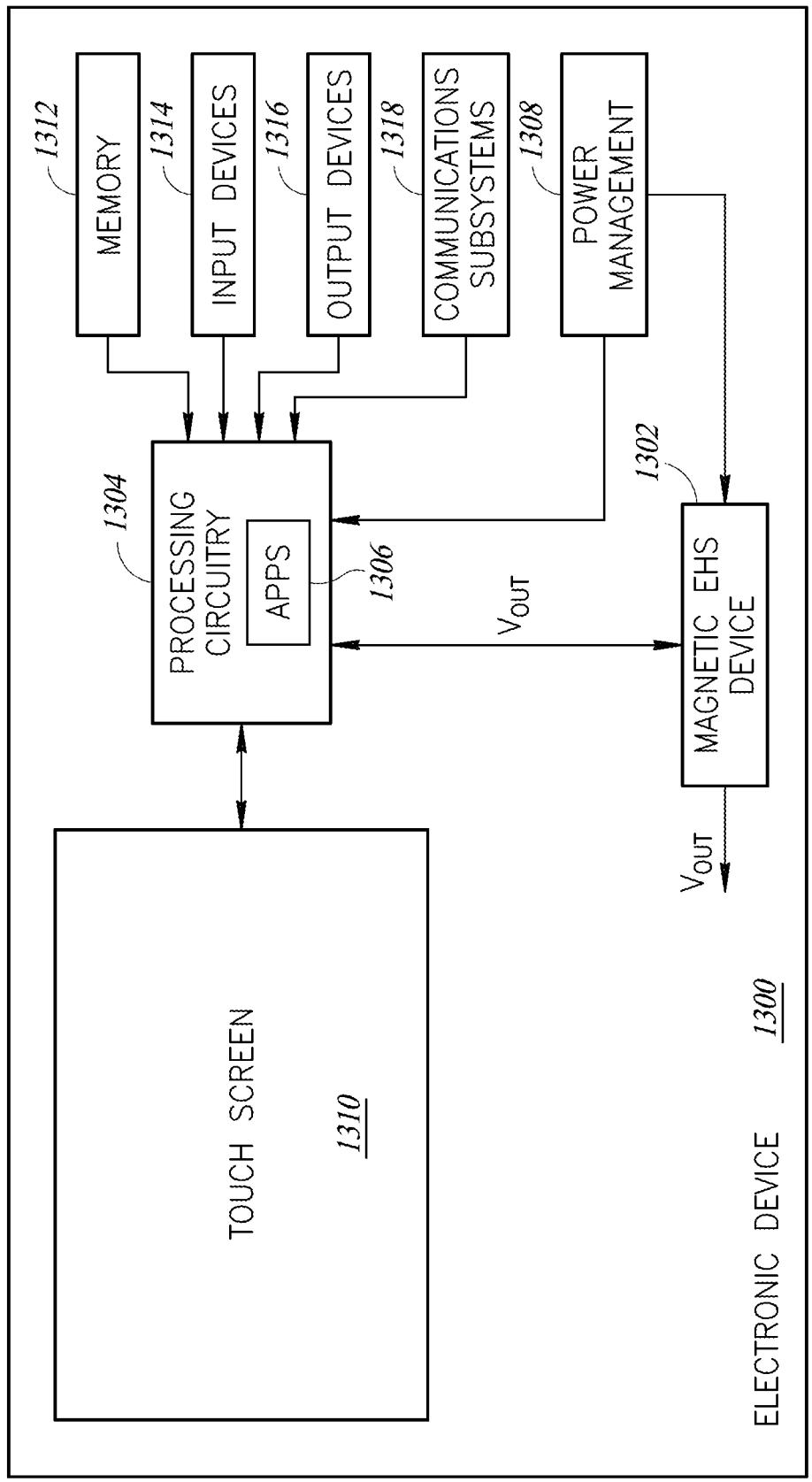
FIG. 13 is a functional block diagram of an electronic device including a reverse electrowetting EHS device according to any of the embodiments of FIGS. 1-12.

FIG. 13 is a functional block diagram of an electronic device 1300 including a reverse electrowetting EHS device 1302 according to any of the previously described embodiments of FIGS. 1-12. The electronic device 1300 in the example embodiment of FIG. 13 includes processing circuitry 1304 that controls the overall operation of the electronic device 1300 and also executes applications or "apps" 1306 that provide specific functionality for a user of the electronic device 1300. In operation, the reverse electrowetting EHS device 1302 generates electrical energy in response to movement of the electronic device 1300. The reverse electrowetting EHS device 1302 supplies this electrical energy, represented in the figure as an output voltage Vout from the reverse electrowetting EHS device 1302, to power the processing circuitry 1304 and other components in the electronic device 1300. The electronic device 1300 may be any type of electronic device, such as a smart phone, wearable electronic device like a heart rate or activity monitor, tablet computer, and so on. Depending on the type of electronic device 1300, the reverse electrowetting EHS device 2302 may generate enough electrical energy to fully power the electronic device or only enough to drive some of the electronic circuitry in the device, or enough to charge or help charge a battery of the electronic device.

A power management subsystem 1308 of the electronic device 1300 is coupled to the processing circuitry 1304 and would typically include a battery for powering the electronic device, and also control circuitry for controlling power-related operating modes of the device such as charging of the battery, power-savings modes, and so on. As mentioned above, the electrical energy generated by the reverse electrowetting EHS device 1302 may be used to charge such a battery contained in the power management subsystem 1308. The power management subsystem 1308 may also control operation of the reverse electrowetting EHS device 1302, such as by activating and deactivating the EHS circuitry (not shown) contained in the EHS device. Although shown separately in FIG. 13, the reverse electrowetting EHS device 1302 may be considered part of the power management subsystem 1308.

The electronic device 1300 further includes a video component such as a touch screen 1310 with a touch display (not shown) such as a liquid crystal display (LCD) and a touch panel (not shown) attached to or formed as an integral part of the touch display. In operation, the touch screen 1310 senses touches of a user of the electronic device 1300 and provides sensed touch information to the processing circuitry 1304 to thereby allow the user to interface with and control the operation of the electronic device. The processing circuitry 1304 also controls the touch screen 1310 to display desired visual content on the touch display portion of the touch screen. The action to touch the screen 1310 is also a mechanical stimulation that may be utilized in generating electrical energy by the reverse electrowetting EHS device 1302.

The electronic device 1300 further includes data storage or memory 1312 coupled to the processing circuitry 1304 for storing and retrieving data including the apps 1306 and other software executing on the processing circuitry and utilized by the electronic device 1300 during operation. Examples of typical types of memory 1312 include solid state memory such as DRAM, SRAM and FLASH, solid state drives (SSDs), and may include any other type of memory suited to the desired functionality of the electronic device 1300 including digital video disks (DVDs), compact disk read-only (CD-ROMs), compact disk read-write (CD-RW) memories, magnetic tape, hard and floppy magnetic disks, tape cassettes, and so on.

Input devices 1314 are coupled to the processing circuitry 1304 and may include a keypad, whether implemented through the touch screen 1310 or separately, a pressure sensor, accelerometer, microphone, keyboard, mouse, digital camera to capture still and video images, and other suitable input devices. Output devices 1316 are coupled to the processing circuitry 1304 and may include, for example, audio output devices such as a speaker, printer, vibration device, and so on. The input devices 1314 and output devices 1316 collectively may include other types of typical communications ports for the electronic device 1300, such as USB ports, HDMI ports, and so on. The electronic device 1300 further includes communications subsystems 1318 coupled to the processing circuitry 1304 and which may include Wi-Fi, GPS, cellular and Bluetooth subsystems for providing the device with the corresponding functionality. The specific type and number of input devices 1314, output devices 1316, communications subsystems 1318, and even the specific functionality of the power management subsystem 1308 will of course depend on the type of the electronic device 1300, which may be any suitable type of electronic device or system to which the reverse electrowetting EHS device 1302 may generate sufficient electrical power to improve the operation of the electronic device or system.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An inverse electrowetting harvesting and scavenging circuit, comprising:
   a first substrate having a first surface and a second surface;
   an electrode formed proximate the first surface, the electrode including a first insulating layer covering a surface of the electrode;
   an electromechanical systems device including a moveable mass that extends over the first surface of the first substrate and may be displaced relative to the first substrate in three dimensions responsive to an external force applied to the moveable mass;
   a moveable electrode formed on the moveable mass;
   a conductive fluid positioned between the insulating layer covering the electrode and the movable electrode; and
   energy harvesting and scavenging circuitry electrically coupled to the moveable electrode and the electrode, the energy harvesting and scavenging circuitry configured to provide electrical energy responsive to electrical energy generated by the moveable electrode, the conductive fluid and the electrode through reverse electrowetting due to movement of the moveable electrode relative to the electrode and to the conductive fluid on top of the electrode.

2. The inverse electrowetting harvesting and scavenging circuit of claim 1, where in the electromechanical systems device comprises a microelectromechanical systems (MEMS) device.

3. The inverse electrowetting harvesting and scavenging circuit of claim 2, wherein the MEMS device further comprises a packaging structure that is coupled to the first surface of the first substrate and defines an internal cavity that houses the moveable mass, the MEMS device further including a supporting structure coupled between the packaging structure and the moveable mass to moveably suspend the moveable mass within the internal cavity.

4. The inverse electrowetting harvesting and scavenging circuit of claim 3, wherein the supporting structure comprises a plurality of arms, each arm coupled between the packaging structure and the moveable mass.

5. The inverse electrowetting harvesting and scavenging circuit of claim 4 further comprising an additional frame structure, each arm coupled to the additional frame structure and the additional frame structure coupled through resilient arms to the packaging structure.

6. The inverse electrowetting harvesting and scavenging circuit of claim 5 further comprising vertical spacers coupled to the additional frame structure to compensate for planarity errors between the movable mass and the electrode.

7. The inverse electrowetting harvesting and scavenging circuit of claim 1, wherein the electrode comprises and interdigitated electrode having a horizontal plate with vertical projections extending from a surface of the horizontal plate towards the moveable electrode, the first insulating layer covering the surface of the horizontal plate and surfaces of the vertical projections.

8. The inverse electrowetting harvesting and scavenging circuit of claim 1,
wherein the moveable electrode comprises and, interdigitated electrode having a horizontal plate with vertical projections extending from a surface of the horizontal plate towards the moveable electrode, the first insulating layer covering the surface of the horizontal plate and surfaces of the vertical projections; and
wherein the electrode comprises a segmented electrode including a plurality of electrode segments, each electrode segment including a vertical projection extending towards the moveable electrode and the vertical projections of the plurality of electrode segments being interdigitated with the vertical projections of the moveable electrode.

9. The inverse electrowetting harvesting and scavenging circuit of claim 8, wherein each of the electrode segments comprises:
first and second L-shaped electrodes, each L-shaped electrode including a horizontal portion and a vertical portion, a first vertical insulating layer being positioned between the vertical-portions of the L-shaped electrodes to electrically isolate the two L-shaped electrodes;
a second insulating layer formed over surfaces of the L-shaped electrodes and an upper edge surface of the vertical insulating layer;
a second vertical insulating layer on the ends of the horizontal portions of each L-shaped electrode to electrically isolate each of the L-shaped electrodes from an adjacent L-shaped electrode.

10. An inverse electrowetting harvesting and scavenging circuit, comprising:
a first substrate having a first surface and a second surface;
an electrode formed proximate the first surface, the electrode including a first insulating layer covering a surface of the electrode;
an electromechanical systems device including a moveable mass that extends over the first surface of the first substrate and may be displaced relative to the first substrate in three dimensions responsive to an external force applied to the moveable mass;
a moveable electrode formed on the moveable mass;
a conductive fluid positioned between the insulating layer covering the electrode and the movable electrode; and
energy harvesting and scavenging circuitry electrically coupled to the moveable electrode and the electrode, the energy harvesting and scavenging circuitry configured to provide electrical energy responsive to electrical energy generated by the moveable electrode, the conductive fluid and the electrode through reverse electrowetting due to movement of the moveable electrode relative to the electrode and to the conductive fluid on top of the electrode;
wherein the moveable electrode comprises a segmented electrode including a plurality of electrode segments, each electrode segment including a vertical projection extending towards the electrode; and
wherein the electrode comprises a segmented electrode including a plurality of electrode segments, each electrode segment including a vertical projection extending towards the moveable electrode and the vertical projections of the plurality of electrode segments of the electrode being interdigitated with the vertical projections of the moveable electrode to generate a plurality of harvested voltages across respective groups of segmented electrodes.

11. The inverse electrowetting harvesting and scavenging circuit of claim 10, wherein each of the electrode segments comprises:
first and second L-shaped electrodes, each L-shaped electrode including a horizontal portion and a vertical portion, a first vertical insulating layer being positioned between the vertical-portions of the L-shaped electrodes to electrically isolate the two L-shaped electrodes;
a second insulating layer formed over surfaces of the L-shaped electrodes and an upper edge surface of the vertical insulating layer;
a second vertical insulating layer on the ends of the horizontal portions of each L-shaped electrode to electrically isolate each of the L-shaped electrodes from an adjacent L-shaped electrode.

12. The inverse electrowetting harvesting and scavenging circuit of claim 1,
wherein the electrode comprises an interdigitated electrode having a horizontal plate with groups of vertical projections extending from a surface of the horizontal plate towards the moveable electrode, the first insulating layer covering surfaces of the vertical projections and at least portions of the surface of the horizontal plate; and
wherein the moveable electrode comprises a horizontal plate with a plurality of fluid confinement projections extending from the horizontal plate towards the electrode, where respective ones of the groups of vertical projections are positioned between adjacent fluid confinement projections.

13. The inverse electrowetting harvesting and scavenging circuit of claim 12, wherein each of the fluid confinement projections has a surface that is covered by an insulating layer.

14. The inverse electrowetting harvesting and scavenging circuit of claim 1, wherein the energy harvesting and scavenging circuitry is formed in the first substrate.

15. The inverse electrowetting harvesting and scavenging circuit of claim 1, wherein the energy harvesting and scavenging circuitry is formed external to the first substrate and is electrically coupled to the first substrate.

16. The inverse electrowetting harvesting and scavenging circuit of claim 1 further comprising a first semiconductor chip including the first substrate.

17. The inverse electrowetting harvesting and scavenging circuit of claim 16, wherein the first semiconductor chip comprises a structural layer formed on the first substrate and wherein the electrode is formed in the structural layer.

18. The inverse electrowetting harvesting and scavenging circuit of claim 1, wherein the moveable mass comprises a support layer and the moveable electrode is attached to the support layer.

19. An inverse electrowetting harvesting and scavenging circuit, comprising:
a first substrate having a first surface and a second surface;
a first electrode formed proximate the first surface, the electrode including a first insulating layer covering a surface of the electrode;
an electromechanical systems device including a moveable mass that extends over the first surface of the first substrate and may be displaced relative to the first substrate in three dimensions responsive to an external force applied to the moveable mass;

a moveable electrode formed on the moveable mass;

a conductive fluid positioned between the insulating layer covering the first electrode and the movable electrode; and a first energy harvesting and scavenging circuit electrically coupled to the moveable electrode and the electrode, the first energy harvesting and scavenging circuit configured to provide electrical energy responsive to electrical energy generated by the moveable electrode the conductive fluid and the first electrode through reverse electrowetting due to movement of the moveable electrode relative to the first electrode and to the conductive fluid on top of the electrode;

an electrode array including a plurality of electrodes including the first electrode;

a plurality of energy harvesting and scavenging circuits coupled to the electrode array, the plurality of energy harvesting and scavenging circuits including the first energy harvesting and scavenging circuit;

a motion sensor configured to generate a signal indicating a direction of movement of the moveable mass;

a motion sensor circuit coupled to the motion sensor and configured to detect the direction of movement of the moveable mass based on the signal from the motion sensor; and a power generation management circuit coupled to the motion sensor circuit and the plurality of energy harvesting and scavenging circuits, the power generation management circuit configured to control the plurality of energy harvesting and scavenging circuits based on the detected direction of the moveable mass to thereby capture generated electrical energy from selected electrodes and the moveable electrode.

20. The inverse electrowetting harvesting and scavenging circuit of claim 19, wherein the motion sensor comprises at least one of the electrodes in the electrode array and the moveable electrode.

21. The inverse electrowetting harvesting and scavenging circuit of claim 1 further comprising a FAMOS transistor 1200 that provides a biasing voltage across the electrode and the moveable electrode.

* * * * *

UNITED STATES PATENT AND TRADEMARK OFFICE
CERTIFICATE OF CORRECTION

PATENT NO. : 10,250,163 B2
APPLICATION NO. : 15/143015
DATED : April 2, 2019
INVENTOR(S) : Sara Loi et al.

Page 1 of 1

It is certified that error appears in the above-identified patent and that said Letters Patent is hereby corrected as shown below:

In the Claims

Column 18, Line 65:
"circuit of claim 1, wherein the electrode comprises and"
Should read:
--circuit of claim 1, wherein the electrode comprises an--.

Column 19, Line 8:
"wherein the moveable electrode comprises and, interdigitated"
Should read:
--wherein the moveable electrode comprises an interdigitated--.

Signed and Sealed this
Twenty-eighth Day of May, 2019

Andrei Iancu
*Director of the United States Patent and Trademark Office*